(12) United States Patent
Chae et al.

(10) Patent No.: US 9,319,097 B2
(45) Date of Patent: Apr. 19, 2016

(54) METHOD FOR GENERATING BINARY OFFSET CARRIER CORRELATION FUNCTION BASED ON LOCAL SIGNALS, APPARATUS FOR TRACKING BINARY OFFSET CARRIER SIGNAL, AND SPREAD SPECTRUM SIGNAL RECEIVER SYSTEM

(71) Applicant: Research & Business Foundation Sungkyunkwan University, Suwon-si (KR)

(72) Inventors: Keun Hong Chae, Suwon-si (KR); Seok Ho Yoon, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 0 days.

(21) Appl. No.: 14/516,872

(22) Filed: Oct. 17, 2014

(65) Prior Publication Data

US 2015/0139282 A1    May 21, 2015

(30) Foreign Application Priority Data

Oct. 18, 2013 (KR) ........................ 10-2013-0124641

(51) Int. Cl.
| | |
|---|---|
| H04B 1/00 | (2006.01) |
| H04B 1/709 | (2011.01) |
| H04B 1/7085 | (2011.01) |
| G01S 19/30 | (2010.01) |
| H04B 1/707 | (2011.01) |

(52) U.S. Cl.
CPC ............... *H04B 1/709* (2013.01); *G01S 19/30* (2013.01); *H04B 1/7085* (2013.01); *H04B 2001/70706* (2013.01)

(58) Field of Classification Search
CPC ............. H03L 7/08–7/0998; H03L 7/10–7/12; H04B 1/7073–1/7087; H04B 2201/7073–2201/70736; H04B 1/709–1/7095
See application file for complete search history.

(56) References Cited

U.S. PATENT DOCUMENTS

| 8,391,339 B2 * | 3/2013 | Wang et al. .................... 375/150 |
| 2005/0281325 A1 * | 12/2005 | Lillo et al. ..................... 375/150 |
| 2015/0117499 A1 * | 4/2015 | Chae et al. ..................... 375/150 |

OTHER PUBLICATIONS

Julien, Olivier, et al. "ASPeCT: Unambiguous Sine-BOC (n, n) Acquisition/Tracking Technique for Navigation Applications." Aerospace and Electronic Systems, IEEE Transactions on 43.1 (2007): 150-162, Alta, Canada.

(Continued)

*Primary Examiner* — Dac Ha
(74) *Attorney, Agent, or Firm* — NSIP Law

(57) ABSTRACT

A method of generating a correlation function used to track a code phase delay value for a local code, in a spread spectrum signal receiver system, to be correlated with a received cosine or sine BOC-modulated signal, in which plurality of pulses successively occur in a single period of a spreading code chip is presented. The Method may include generating a local signal pair having a phase delay value based on a first and second local signal pair defined by first and last pulses of a signal pulse train, received during a single period of a subcarrier of the received signal, and a given main peak shape parameter, generating a sub-correlation function pair by performing correlation operations of the received signal and the local signal pair with respect to a total time and generating a main correlation function having only a main peak by performing an elimination operation of the sub-correlation function pair.

28 Claims, 8 Drawing Sheets

(56) References Cited

OTHER PUBLICATIONS

Yao, Zheng, et al. "Pseudo-Correlation-Function-Based Unambiguous Tracking Technique for Sine-BOC Signals." Aerospace and Electronic Systems, IEEE Transactions on 46.4 (2010): 1782-1796, Beijing, China.

Kim, Hongdeuk, et al. "A Novel Unambiguous Correlation Function for Cosine-Phased BOC Signal Tracking." The Journal of Korean Institute of Communications and Information Sciences 38.5 (2013): 409-415, Seoul, South Korea.

Korean Office Action issued on Jul. 7, 2014 in counterpart Korean Application No. 10-2013-0124641 (5 pages in Korean).

* cited by examiner (a) $BOC_{sin}(n,n)$ (b) $BOC_{sin}(2n,n)$ (a) $BOC_{cos}(n,n)$ (b) $BOC_{cos}(2n,n)$ (a) $BOC_{sin}(n,n)$ (b) $BOC_{sin}(2n,n)$ (a) $BOC_{cos}(n,n)$ (b) $BOC_{cos}(2n,n)$

METHOD FOR GENERATING BINARY OFFSET CARRIER CORRELATION FUNCTION BASED ON LOCAL SIGNALS, APPARATUS FOR TRACKING BINARY OFFSET CARRIER SIGNAL, AND SPREAD SPECTRUM SIGNAL RECEIVER SYSTEM

BACKGROUND

1. Technical Field

The present invention relates to spread spectrum signal technology and, more particularly, to a scheme for tracking a binary offset carrier (BOC) signal that is generally used in satellite navigation technology.

2. Description of Related Art

Satellite navigation technology is technology that is configured such that, when a plurality of navigation satellites randomly transmit a plurality of satellite navigation signals, each containing information about the current location and time of the corresponding navigation satellite, to the ground, a satellite navigation receiver on the ground receives the plurality of satellite navigation signals, calculates the coordinates of the current locations of the navigation satellites and the arrival times of the signals, and determines its three-dimensional (3D) location in the Earth coordinate system using triangulation.

A satellite navigation receiver theoretically requires at least three satellite signals in order to determine its longitude, latitude and height, and requires one more satellite signals in order to improve accuracy by eliminating time error between satellites. Accordingly, at least four satellites are required.

Across the world, many countries have developed independent satellite navigation systems for economic and military reasons. Although the United States Global Positioning System (GPS) is most widely used and famous, the European Union's Galileo system, the Russian GLONASS, the Chinese COMPASS system, and the Japanese QZSS system (which will be expanded to the JRANS system in the future) are also being currently operated or developed.

Since satellite navigation signals should be robust to interference and jamming, various and elaborate modulation schemes have been employed. It is worthy of notice that the majority of the next-generation satellite navigation systems have replaced a conventional a phase shift keying (PSK) modulation scheme or have employed a BOC modulation scheme in addition to a PSK modulation scheme. The width of the main peak of an autocorrelation function used for the BOC modulation scheme is short, and thus the BOC modulation scheme exhibits better signal tracking performance than the PSK modulation scheme.

Furthermore, the BOC modulation scheme is characterized in that spectral separation occurs and energy is shifted from the center of a band to the periphery thereof, unlike the PSK modulation scheme, and thus the BOC modulation scheme can be additionally applied to a band in which a conventional modulation scheme has been used. Using these characteristics, the next-generation satellite navigation systems can employ the BOC modulation scheme in addition to the PSK modulation scheme, thereby being able to ensure the improvement of performance and backward compatibility.

A BOC signal is a signal that is expressed as a product of a pseudo random noise (PRN) code with a sine or cosine rectangular sub-carrier. A BOC signal is expressed as a $BOC_{sin}(kn,n)$ or a $BOC_{cos}(kn,n)$ depending on the type of sub-carrier, where k is a positive integer indicative of the ratio of the chip period of a PRN code to the period of a sub-carrier, and n is indicative of the ratio of PRN code chip transmission rate to 1.023 MHz, that is, the clock frequency of a C/A code.

Although a BOC signal has high signal tracking performance and excellent compatibility with the conventional PSK modulation scheme, it is problematic in that many side peaks occur around a main peak where an autocorrelation function has the highest value, unlike the PSK scheme having a single peak. A problem in which, upon tracking a BOC signal, synchronization is established with a side peak instead of a main peak due to the presence of side peaks, that is, the so-called ambiguity problem, may occur.

SUMMARY

An object of the present invention is to provide a method of generating a BOC correlation function based on local signals, an apparatus for tracking a BOC signal, and a spread spectrum signal receiver system using the same.

An object of the present invention is to provide a method of generating a BOC correlation function, an apparatus for tracking a BOC signal, and a spread spectrum signal receiver system using the same, which are capable of overcoming the disadvantages of conventional BOC signal tracking techniques in which the conventional BOC signal tracking techniques can eliminate only side peaks close to a main peak but cannot eliminate side peaks remote from the main peak, or can be applied only to a $BOC_{sin}(kn,n)$ signal but cannot be applied to a $BOC_{cos}(kn,n)$ signal, thereby being applicable to both $BOC_{sin}(kn,n)$ and $BOC_{cos}(kn,n)$ signals.

An object of the present invention is to provide a method of generating a BOC correlation function, an apparatus for tracking a BOC signal, and a spread spectrum signal receiver system using the same, which are capable of not only eliminating side peaks but also adjusting the width and height of a main peak.

The objects of the present invention are not limited to the above-described objects, and other objects that have not been described above will be clearly understood by those skilled in the art from the following description.

In accordance with an embodiment of the present invention, there is a delay lock loop (DLL) for tracking a code phase delay value for a local code to be correlated with a received cosine or sine BOC-modulated signal, in which N pulses successively occur in a single period $T_c$ of a spreading code chip, in a spread spectrum signal receiver system, the DLL including:

a local signal generation unit configured to generate an early local signal pair $$g_1\left(t+\tau+\frac{\Delta}{2};a\right) \text{ and } g_2\left(t+\tau+\frac{\Delta}{2};a\right)$$

and a late local signal pair $$g_1\left(t+\tau-\frac{\Delta}{2};a\right) \text{ and } g_2\left(t+\tau-\frac{\Delta}{2};a\right)$$

each having a phase delay value $\tau$ and a delay value difference $\Delta$ based on a first and second local signal pair $g_1(\tau;a)$ and $g_2(\tau;a)$ defined by first and last pulses of a signal pulse train, received during a single period of a sub-carrier of the received signal, and a given main peak shape parameter $\alpha$;

early and late correlation units configured to generate an early sub-correlation function pair $$R_1\left(\tau + \frac{\Delta}{2}; a\right) \text{ and } R_2\left(\tau + \frac{\Delta}{2}; a\right)$$

and a late sub-correlation function pair $$R_1\left(\tau - \frac{\Delta}{2}; a\right) \text{ and } R_2\left(\tau - \frac{\Delta}{2}; a\right)$$

by performing correlation operations of the early and late mixing signal pairs with respect to a total time T(0≤t≤T);

early and late combination units configured to generate an early main correlation function $$R_{proposed}\left(\tau + \frac{\Delta}{2}; a\right)$$

and a late main correlation function $$R_{proposed}\left(\tau - \frac{\Delta}{2}; a\right)$$

each having a main peak by performing elimination operations on the early sub-correlation function pair and the late sub-correlation function pair; and a numerical control oscillator (NCO) configured to determine a phase delay value τ of a first and second local signal pair for the received signal based on a filtered discrimination output, and to output the determined phase delay value τ to the local signal generation unit;

wherein the elimination operation is an operation related to an algebraic relation in which if real numbers x and y are xy≥0, |x|+|y|−|x−y|=0.

In accordance with an embodiment, the first and second local signal pair $g_1(t;a)$ and $g_2(t;a)$ may be defined by first and last pulses $c_{i,0}(t)$ and $c_{i,N-1}(t)$ of N pulses, constituting a signal pulse train received during an i-th sub-carrier period of the received signal, and a main peak shape parameter α in accordance with the following equations:

$$\begin{cases} g_1(t;a) = \sum_{i=-\infty}^{\infty} \sqrt{\frac{N}{1+a^2}} \, (c_{i,0}(t) - ac_{i,N-1}(t)) \\ g_2(t;a) = \sum_{i=-\infty}^{\infty} \sqrt{\frac{N}{1+a^2}} \, (ac_{i,0}(t) - c_{i,N-1}(t)) \end{cases},$$

In accordance with an embodiment, if the BOC modulated received signal is $BOC_{sin}(kn,n)$, $g_1(t;a)$ may appear in the form of a pulse having a size of $$\sqrt{\frac{N}{1+a^2}}$$

at a location of the first pulse of the received signal pulse train and a pulse having a size of $$a\sqrt{\frac{N}{1+a^2}}$$

at a location of the last pulse thereof; and $g_2(t;a)$ may appear in the form of a pulse having a size of $$a\sqrt{\frac{N}{1+a^2}}$$

at a location of the first pulse of the received signal pulse train and a pulse having a size of $$\sqrt{\frac{N}{1+a^2}}$$

at a location of the last pulse thereof.

In accordance with an embodiment, if a received signal B(t) is $BOC_{cos}(kn,n)$, $g_1(t;a)$ may appear in the form of a pulse having a size of $$\sqrt{\frac{N}{1+a^2}}$$

at a location of the first pulse of the received signal pulse train and a pulse having a size of $$-a\sqrt{\frac{N}{1+a^2}}$$

at a location of the last pulse thereof; and $g_2(t;a)$ may appear in the form of a pulse having a size of $$a\sqrt{\frac{N}{1+a^2}}$$

at a location of the first pulse of the received signal pulse train and a pulse having a size of $$-\sqrt{\frac{N}{1+a^2}}$$

at a location of the last pulse thereof.

In accordance with an embodiment, the early main correlation function $$R_{proposed}\left(\tau + \frac{\Delta}{2}; a\right)$$

and the late main correlation function $$R_{proposed}\left(\tau - \frac{\Delta}{2}; a\right)$$

may be generated to each have a waveform having only a main peak having a width of $$\frac{2(1-a)T_c}{N(2-a)}$$

and a height of $$\sqrt{\frac{4(1-a)^2}{(N+Na)^2}}$$

by combining the early sub-correlation function pair and the late sub-correlation function pair.

In accordance with an embodiment, the early main correlation function $$R_{proposed}\left(\tau + \frac{\Delta}{2}; a\right)$$

may have a waveform obtained by subtracting a waveform obtained by taking an absolute value of a sum of $$R_1\left(\tau + \frac{\Delta}{2}; a\right) \text{ and } R_2\left(\tau + \frac{\Delta}{2}; a\right)$$

from a waveform obtained by adding an absolute value of $$R_1\left(\tau + \frac{\Delta}{2}; a\right)$$

and an absolute value of $$R_2\left(\tau + \frac{\Delta}{2}; a\right),$$

with respect to the early sub-correlation function pair; and
the late main correlation function $$R_{proposed}\left(\tau - \frac{\Delta}{2}; a\right)$$

may have a waveform obtained by subtracting a waveform obtained by taking an absolute value of a sum of $$R_1\left(\tau - \frac{\Delta}{2}; a\right) \text{ and } R_2\left(\tau - \frac{\Delta}{2}; a\right)$$

from a waveform obtained by adding an absolute value of $$R_1\left(\tau - \frac{\Delta}{2}; a\right)$$

and an absolute value of $$R_2\left(\tau - \frac{\Delta}{2}; a\right),$$

with respect to the late sub-correlation function pair.

In accordance with an embodiment, the discrimination function may be selected to determine whether a value of the main correlation function based on the phase delay value $\tau$ is located at an apex of the main peak based on the discrimination output.

In accordance with an embodiment, the discrimination function $D(\tau)$ may be defined by the following Equation:

$$D(\tau) = R_{proposed}^2\left(\tau + \frac{\Delta}{2}; a\right) - R_{proposed}^2\left(\tau - \frac{\Delta}{2}; a\right)$$

In accordance with an embodiment, the code phase delay value for the local code may be determined to be a phase delay value $\tau$ when a zero-crossing of the discrimination function $D(\tau)$ is detected.

In accordance with another aspect of the present invention, there is provided a binary offset carrier (BOC) signal tracking method for tracking a code phase delay value for a local code to be correlated with a received cosine or sine BOC-modulated signal, in which N pulses successively occur in a single period $T_c$ of a spreading code chip, in a spread spectrum signal receiver system, the method including:
generating an early local signal pair $$g_1\left(t + \tau + \frac{\Delta}{2}; a\right) \text{ and } g_2\left(t + \tau + \frac{\Delta}{2}; a\right)$$

and a late local signal pair $$g_1\left(t + \tau - \frac{\Delta}{2}; a\right) \text{ and } g_2\left(t + \tau - \frac{\Delta}{2}; a\right)$$

each having a phase delay value $\tau$ and a delay value difference $\Delta$ based on a first and second local signal pair $g_1(\tau;a)$ and $g_2(\tau;a)$ defined by first and last pulses of a signal pulse train, received during a single period of a sub-carrier of the received signal, and a given main peak shape parameter a;
generating an early sub-correlation function pair $$R_1\left(\tau + \frac{\Delta}{2}; a\right) \text{ and } R_2\left(\tau + \frac{\Delta}{2}; a\right)$$

and a late sub-correlation function pair $$R_1\left(\tau - \frac{\Delta}{2}; a\right) \text{ and } R_2\left(\tau - \frac{\Delta}{2}; a\right)$$

by performing correlation operations of the early and late mixing signal pairs with respect to a total time $T(0 \leq t \leq T)$;

generating an early main correlation function $$R_{proposed}\left(\tau + \frac{\Delta}{2}; a\right)$$

and a late main correlation function $$R_{proposed}\left(\tau - \frac{\Delta}{2}; a\right)$$

each having a main peak by performing elimination operations on the early sub-correlation function pair and the late sub-correlation function pair; and determining a phase delay value $\tau$ of a first and second local signal pair for the received signal based on a filtered discrimination output, and outputting the determined phase delay value $\tau$;

wherein the elimination operation is an operation related to an algebraic relation in which if real numbers x and y are $xy \geq 0$, $|x|+|y|-|x-y|=0$.

In accordance with an embodiment, the first and second local signal pair $g_1(t;a)$ and $g_2(t;a)$ may be defined by first and last pulses $c_{i,0}(t)$ and $c_{i,N-1}(t)$ of N pulses, constituting a signal pulse train received during an i-th sub-carrier period of the received signal, and a main peak shape parameter a in accordance with the following equations:

$$\begin{cases} g_1(t; a) = \sum_{i=-\infty}^{\infty} \sqrt{\frac{N}{1+a^2}} \left(c_{i,0}(t) - ac_{i,N-1}(t)\right) \\ g_2(t; a) = \sum_{i=-\infty}^{\infty} \sqrt{\frac{N}{1+a^2}} \left(ac_{i,0}(t) - c_{i,N-1}(t)\right) \end{cases},$$

In accordance with an embodiment, if the BOC modulated received signal is $BOC_{sin}(kn,n)$, $g_1(t;a)$ may appear in the form of a pulse having a size of $$\sqrt{\frac{N}{1+a^2}}$$

at a location of the first pulse of the received signal pulse train and a pulse having a size of $$a\sqrt{\frac{N}{1+a^2}}$$

at a location of the last pulse thereof; and
$g_2(t;a)$ may appear in the form of a pulse having a size of $$a\sqrt{\frac{N}{1+a^2}}$$

at a location of the first pulse of the received signal pulse train and a pulse having a size of $$\sqrt{\frac{N}{1+a^2}}$$

at a location of the last pulse thereof.

In accordance with an embodiment, if a received signal B(t) is $BOC_{cos}(kn,n)$, $g_1(t;a)$ may appear in the form of a pulse having a size of $$\sqrt{\frac{N}{1+a^2}}$$

at a location of the first pulse of the received signal pulse train and a pulse having a size of $$-a\sqrt{\frac{N}{1+a^2}}$$

at a location of the last pulse thereof; and
$g_2(t;a)$ may appear in the form of a pulse having a size of $$a\sqrt{\frac{N}{1+a^2}}$$

at a location of the first pulse of the received signal pulse train and a pulse having a size of $$-\sqrt{\frac{N}{1+a^2}}$$

at a location of the last pulse thereof.

In accordance with an embodiment, the early main correlation function $$R_{proposed}\left(\tau + \frac{\Delta}{2}; a\right)$$

and the late main correlation function $$R_{proposed}\left(\tau - \frac{\Delta}{2}; a\right)$$

may be generated to each have a waveform having only a main peak having a width of $$\frac{2(1-a)T_c}{N(2-a)}$$

and a height of $$\sqrt{\frac{4(1-a)^2}{(N+Na^2)}}$$

by combining the early sub-correlation function pair and the late sub-correlation function pair.

In accordance with an embodiment,
the early main correlation function $$R_{proposed}\left(\tau+\frac{\Delta}{2};a\right)$$

may have a waveform obtained by subtracting a waveform obtained by taking an absolute value of a sum of $$R_1\left(\tau+\frac{\Delta}{2};a\right) \text{ and } R_2\left(\tau+\frac{\Delta}{2};a\right)$$

from a waveform obtained by adding an absolute value of $$R_1\left(\tau+\frac{\Delta}{2};a\right)$$

and an absolute value of $$R_2\left(\tau+\frac{\Delta}{2};a\right),$$

with respect to the early sub-correlation function pair; and
the late main correlation function $$R_{proposed}\left(\tau-\frac{\Delta}{2};a\right)$$

may have a waveform obtained by subtracting a waveform obtained by taking an absolute value of a sum of $$R_1\left(\tau-\frac{\Delta}{2};a\right) \text{ and } R_2\left(\tau-\frac{\Delta}{2};a\right)$$

from a waveform obtained by adding an absolute value of $$R_1\left(\tau-\frac{\Delta}{2};a\right)$$

and an absolute value of $$R_2\left(\tau-\frac{\Delta}{2};a\right),$$

with respect to the late sub-correlation function pair.

In accordance with an embodiment, the discrimination function may be selected to determine whether a value of the main correlation function based on the phase delay value $\tau$ is located at an apex of the main peak based on the discrimination output.

In accordance with an embodiment, the discrimination function $D(\tau)$ may be defined by the following Equation:

$$D(\tau) = R_{proposed}^2\left(\tau+\frac{\Delta}{2};a\right) - R_{proposed}^2\left(\tau-\frac{\Delta}{2};a\right)$$

In accordance with an embodiment, the code phase delay value for the local code may be determined to be a phase delay value $\tau$ when a zero-crossing of the discrimination function $D(\tau)$ is detected.

In accordance with another aspect of the present invention, there is provided a method of generating a correlation function used to track a code phase delay value for a local code to be correlated with a received cosine or sine BOC-modulated signal, in which N pulses successively occur in a single period $T_c$ of a spreading code chip, in a spread spectrum signal receiver system, the method including:

generating a local signal pair $g_1(t+\tau;a)$ and $g_2(t+\tau;a)$ having a phase delay value z based on a first and second local signal pair $g_1(\tau;a)$ and $g_2(\tau;a)$ defined by first and last pulses of a signal pulse train, received during a single period of a sub-carrier of the received signal, and a given main peak shape parameter a;

generating a sub-correlation function pair $R_1(\tau;a)$ and $R_2(\tau;a)$ by performing correlation operations of the received signal and the local signal pair with respect to a total time $T(0 \le t \le T)$; and generating a main correlation function $R_{proposed}(\tau;a)$ having only a main peak by performing an elimination operation of the sub-correlation function pair $R_1(\tau;a)$ and $R_2(\tau;a)$;

wherein the elimination operation is an operation related to an algebraic relation in which if real numbers x and y are $xy \ge 0$, $|x|+|y|-|x-y|=0$.

In accordance with an embodiment, the first and second local signal pair $g_1(t;a)$ and $g_2(t;a)$ may be defined by first and last pulses $c_{i,0}(t)$ and $c_{i,N-1}(t)$ of N pulses, constituting a signal pulse train received during an i-th sub-carrier period of the received signal, and a main peak shape parameter a in accordance with the following equations:

$$\begin{cases} g_1(t;a) = \sum_{i=-\infty}^{\infty} \sqrt{\frac{N}{1+a^2}} \left(c_{i,0}(t) - ac_{i,N-1}(t)\right), \\ g_2(t;a) = \sum_{i=-\infty}^{\infty} \sqrt{\frac{N}{1+a^2}} \left(ac_{i,0}(t) - c_{i,N-1}(t)\right) \end{cases}$$

In accordance with an embodiment, if the BOC modulated received signal is $BOC_{sin}(kn,n)$,
$g_1(t;a)$ may appear in the form of a pulse having a size of $$\sqrt{\frac{N}{1+a^2}}$$

at a location of the first pulse of the received signal pulse train and a pulse having a size of $$a\sqrt{\frac{N}{1+a^2}}$$

at a location of the last pulse thereof; and $g_2(t;a)$ may appear in the form of a pulse having a size of $$a\sqrt{\frac{N}{1+a^2}}$$

at a location of the first pulse of the received signal pulse train and a pulse having a size of $$\sqrt{\frac{N}{1+a^2}}$$

at a location of the last pulse thereof.

In accordance with an embodiment, if a received signal B(t) is $BOC_{cos}(kn,n)$, $g_1(t;a)$ may appear in the form of a pulse having a size of $$\sqrt{\frac{N}{1+a^2}}$$

at a location of the first pulse of the received signal pulse train and a pulse having a size of $$-a\sqrt{\frac{N}{1+a^2}}$$

at a location of the last pulse thereof; and $g_2(t;a)$ may appear in the form of a pulse having a size of $$a\sqrt{\frac{N}{1+a^2}}$$

at a location of the first pulse of the received signal pulse train and a pulse having a size of $$-\sqrt{\frac{N}{1+a^2}}$$

at a location of the last pulse thereof.

In accordance with an embodiment, the main correlation function $R_{proposed}(\tau;a)$ may be generated to have a waveform having a main peak having a width of $$\frac{2(1-a)T_c}{N(2-a)}$$

and a height of $$\sqrt{\frac{4(1-a)^2}{(N+Na^2)}}$$

by combining the sub-correlation function pair.

In accordance with an embodiment, the main correlation function $R_{proposed}(\tau;a)$ may have a waveform obtained by subtracting a waveform obtained by taking an absolute value of a sum of $R_1(\tau;a)$ and $R_2(\tau;a)$ from a waveform obtained by adding an absolute value of $R_1(\tau;a)$ and an absolute value of $R_2(\tau;a)$, with respect to the sub-correlation function pair.

In accordance with still another aspect of the present invention, there is an apparatus for tracking a BOC signal, including:

a frequency offset compensation unit configured to output a compensated received signal compensated for frequency offset of a carrier frequency based on a carrier frequency compensation value with respect to a received signal obtained by cosine or sine BOC-modulating predetermined data;

a local code generation unit configured to generate a delay-compensated local code based on a code phase delay value;

a mixer configured to mix the delay-compensated local code with the frequency offset-compensated received signal;

a DLL configured to repeatedly track and calculate a code phase delay value that allows a correlation value obtained by correlating the delay-compensated local signal and the frequency offset-compensated received signal with each other is located at an apex of a main peak of a correlation function, and to provide the calculated code phase delay value to the local code generation unit;

a phase lock loop (PLL) configured to repeatedly calculate a carrier frequency compensation value based on an autocorrelation value of a local code, based on the tracked code phase delay value, so that a phase error of a carrier signal can be minimized, and to provide the carrier frequency compensation value to the frequency offset compensation unit; and a data extraction unit configured to extract spreading data from a mixture of the delay-compensated local code and the compensated received signal;

wherein the DLL operates to:

generate a local signal pair $g_1(t+\tau;a)$ and $g_2(t+\tau;a)$ having a phase delay value $\tau$ based on a first and second local signal pair $g_1(\tau;a)$ and $g_2(\tau;a)$ defined by first and last pulses of a signal pulse train, received during a single period of a sub-carrier of the compensated received signal, and a given main peak shape parameter a;

generate a sub-correlation function pair $R_1(\tau;a)$ and $R_2(\tau;a)$ by performing correlation operations of the compensated received signal and the local signal pair with respect to a total time T(0≤t≤T);

generate a main correlation function $R_{proposed}(\tau;a)$ having only a main peak by performing an elimination operation of the sub-correlation function pair $R_1(\tau;a)$ and $R_2(\tau;a)$; and acquire and track a code phase delay value based on the generated main correlation function;

wherein the elimination operation is an operation related to an algebraic relation in which if real numbers x and y are xy≥0, |x|+|y|−|x−y|=0.

The received BOC signal may carry satellite navigation data; and the data extraction unit may operate to extract the satellite navigation data and estimate a pseudorange based on the extracted navigation data.

In accordance with still another aspect of the present invention, there is a spread spectrum signal receiver system, including:

a front end unit configured to output a digital received signal obtained by cosine or sine BOC-modulating a space wireless signal received from an antenna;

a baseband processing unit configured to acquire and track a code phase delay value for the output digital received signal using a DLL, to compensate for carrier frequency offset using a PLL, and to extract the contained data from a code delay-compensated local code and a frequency offset-compensated compensated received signal; and an application function processing unit configured to perform a predetermined application function based on the extracted contained data;

wherein the baseband processing unit comprises a DLL that operates to:

generate a local signal pair $g_1(t+\tau;a)$ and $g_2(t+\tau;a)$ having a phase delay value T based on a first and second local signal pair $g_1(\tau;a)$ and $g_2(\tau;a)$ defined by first and last pulses of a signal pulse train, received during a single period of a sub-carrier of the compensated received signal, and a given main peak shape parameter a;

generate a sub-correlation function pair $R_1(\tau;a)$ and $R_2(\tau;a)$ by performing correlation operations of the compensated received signal and the local signal pair with respect to a total time $T (0 \leq t \leq T)$;

generate a main correlation function $R_{proposed}(\tau;a)$ having only a main peak by performing an elimination operation of the sub-correlation function pair $R_1(\tau;a)$ and $R_2(\tau;a)$; and acquire and track a code phase delay value based on the generated main correlation function;

wherein the elimination operation is an operation related to an algebraic relation in which if real numbers x and y are $xy \geq 0$, $|x|+|y|-|x-y|=0$.

In accordance with an embodiment, the spread spectrum signal receiver system may be a satellite navigation signal receiver system;

the baseband processing unit may operate to extract a pseudorange from each of a plurality of satellites to a satellite navigation signal receiver system from the contained data; and the application function processing unit may operate to calculate coordinates of the satellite navigation signal receiver system based on the pseudoranges provided with respect to the plurality of satellites.

In accordance with the prevent invention, there are provided a method of generating a BOC correlation function based on local signals, an apparatus for tracking a BOC signal, and a spread spectrum signal receiver system using the same, which are capable of overcoming the disadvantages of conventional BOC signal tracking techniques in which the conventional BOC signal tracking techniques can eliminate only side peaks close to a main peak but cannot eliminate side peaks remote from the main peak, or can be applied only to a $BOC_{sin}(kn,n)$ signal but cannot be applied to a $BOC_{cos}(kn,n)$ signal, thereby being applicable to both $BOC_{sin}(kn,n)$ and $BOC_{cos}(kn,n)$ signals.

In accordance with the prevent invention, there are provided a method of generating a BOC correlation function based on local signals, an apparatus for tracking a BOC signal, and a spread spectrum signal receiver system using the same, which are capable of not only eliminating side peaks but also adjusting the width and height of a main peak.

The advantages of the present invention are not limited to the above-described advantages, and other advantages that have not been described above will be clearly understood by those skilled in the art from the following description.

DETAILED DESCRIPTION

Figure 1:
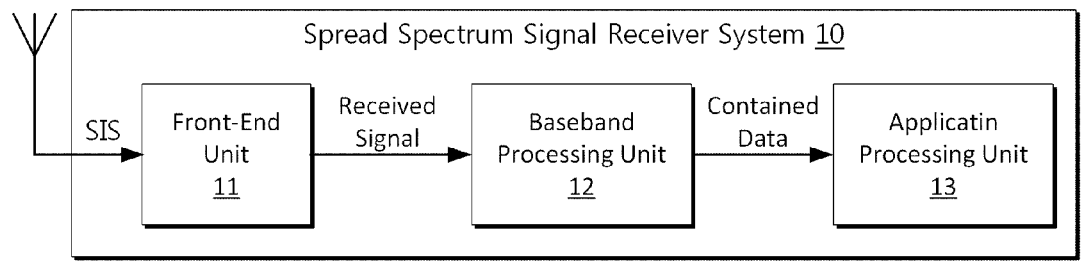
FIG. 1 is a block diagram illustrating a spread spectrum signal receiver system according to an embodiment of the present invention.

With regard to embodiments of the present invention disclosed herein, specific structural and functional descriptions are given merely for the purpose of illustrating the embodiments of the present invention. Embodiments of the present invention may be practiced in various forms, and the present invention should not be construed as being limited to embodiments disclosed herein.

Embodiments of the present invention will be described in detail below with reference to the accompanying drawings. The same reference numerals will be used to denote the same components throughout the accompanying drawings, and descriptions of the same components will be omitted.

FIG. 1 is a block diagram illustrating a spread spectrum signal receiver system 10 according to an embodiment of the present invention.

Referring to FIG. 1, the spread spectrum signal receiver system 10 includes an antenna, a front end unit 11, a baseband processing unit 12, and an application function processing unit 13.

A signal in space (SIS) received by the antenna is subjected to tuning, down conversion, filtering, amplification, and digital sampling by the front end unit 11, and is then output as a digital received signal.

The baseband processing unit 12 acquires and tracks code delay using a delay lock loop (DLL) based on a signal correlation technique with respect to the output digital received signal, compensates for carrier frequency offset using a phase lock loop (PLL) in order to compensate for the fading or Doppler effect, and extracts carried data from a code delay-compensated local signal and a frequency offset-compensated received signal.

In particular, if the digital received signal is a satellite navigation signal received from a navigation satellite and the extracted carried data is satellite navigation data, the baseband processing unit 12 may additionally generate the pseudorange from a satellite to the spread spectrum signal receiver system 10 based on the satellite navigation data, and may output the pseudorange.

Furthermore, the baseband processing unit 12 may extract phase measurement data, satellite location data (almanac), satellite clock information, satellite orbit data (ephemeris), etc. from the compensated received signal, in addition to the pseudorange.

In this case, the baseband processing unit 12 of the spread spectrum signal receiver system 10 according to the present embodiment may eliminate side peaks and generate a correlation function having only a main peak using a new DLL using a new local signal and two sub-correlation functions generated from the new local signal (which will be descried later), and may accurately acquire and track a code delay based on the generated correlation function having only a main peak.

The application function processing unit 13 may perform a specific predetermined application function in accordance with the purpose of the spread spectrum signal receiver system 10.

As an example, when the spread spectrum signal receiver system 10 is a disaster broadcast signal receiver system, the application function processing unit 13 may extract disaster alarm broadcast data from extracted carried data and provide an appropriate disaster alarm to a user.

As another example, when the spread spectrum signal receiver system 10 is a satellite navigation signal receiver system, the application function processing unit 13 may calculate the coordinates and movement of the receiver system 10 based on pseudoranges provided in connection with a plurality of satellites.

In this case, for example, the application function processing unit 13 may calculate the 2D coordinates of the receiver system 10 from the pseudoranges obtained for three satellites, and may calculate 3D coordinates from the pseudoranges obtained for at least four satellites.

Figure 2:
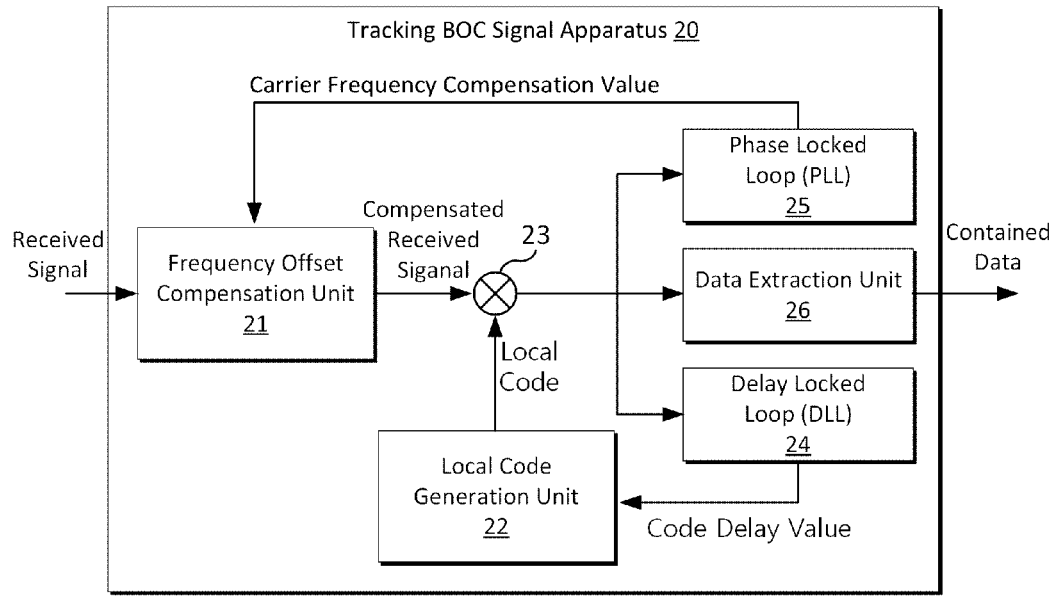
FIG. 2 is a block diagram illustrating an apparatus for tracking a BOC signal according to an embodiment of the present invention.

FIG. 2 is a block diagram illustrating an apparatus for tracking a BOC signal according to an embodiment of the present invention.

The baseband processing unit 12 of the spread spectrum signal receiver system 10 of FIG. 1 may acquire and minimize code delay using circuits, such as an apparatus for tracking a BOC signal 20 illustrated in FIG. 2.

Referring to FIG. 2, the apparatus 20 for tracking a BOC signal may include a frequency offset compensation unit 21, a local code generation unit 22, a mixer 23, a DLL 24, a PLL 25, and a data extraction unit 26.

When the apparatus 20 for tracking a BOC signal receives a BOC signal, for example, it takes time for a spread spectrum signal modulated into a PRN code in a navigation satellite to reach the receiver system 10, and a carrier frequency offset occurs during the travel of the signal due to the fading or Doppler effect. Accordingly, in order to accurately track and demodulate the BOC signal, a code phase delay value and carrier frequency offset should be known.

Since it is impossible to know a code phase delay value and a frequency offset value or they should be inaccurately estimated when a spread spectrum signal is received first, the code phase delay value should be determined or a carrier frequency should be compensated via the DLL 24 or PLL 25.

First, the frequency offset compensation unit 21 outputs a compensated received signal obtained by compensating the BOC modulated spread spectrum signal for carrier frequency fading or frequency offset attributable to the Doppler effect based on a carrier frequency compensation value provided by the PLL 25. Since there is no information used to compensate for calculated carrier frequency offset in the beginning stage, a default value or a previous estimated value may be applied.

The local code generation unit 22 generates a delay-compensated local code based on a code phase delay value that is calculated by the DLL 24. Since there is no calculated code phase delay value in the beginning stage, a default value or a previous estimated value may be applied.

The mixer 23 mixes the delay-compensated local code and the frequency offset-compensated received signal.

The DLL 24 repeatedly tracks and calculates a code phase delay value that allows the value of a correlation function, obtained by performing the correlation of the compensated received signal and a novel local signal according to the present invention, to be located at the main peak of the correlation function, and provides the calculated code phase delay value to the local code generation unit 22.

More specifically, although will be described in greater detail below, the DLL 24 correlates a newly designed local signal with a compensated received signal unlike a conventional DLL using a local code based on a spread code, thereby eliminating side peaks other than a main peak and also adjusting the shape of the main peak, with the result that the DLL 24 can improve tracking performance.

The PLL 25 repeatedly compensates a carrier frequency based on the autocorrelation value of the local code based on the tracked code phase delay value so that the phase error of a carrier signal can be minimized, and then provides a carrier frequency compensation value to the frequency offset compensation unit 21.

After the compensated received signal has been appropriately acquired and tracked, the data extraction unit 26 may accurately extract carried data, such as satellite navigation data modulated into a PRN code on a satellite side, from a mixture of the delay-compensated local code and the frequency deviation-compensated compensated received signal.

Furthermore, the data extraction unit 26 may estimate the pseudorange to the satellite based on the extracted satellite navigation data.

Figure 3:
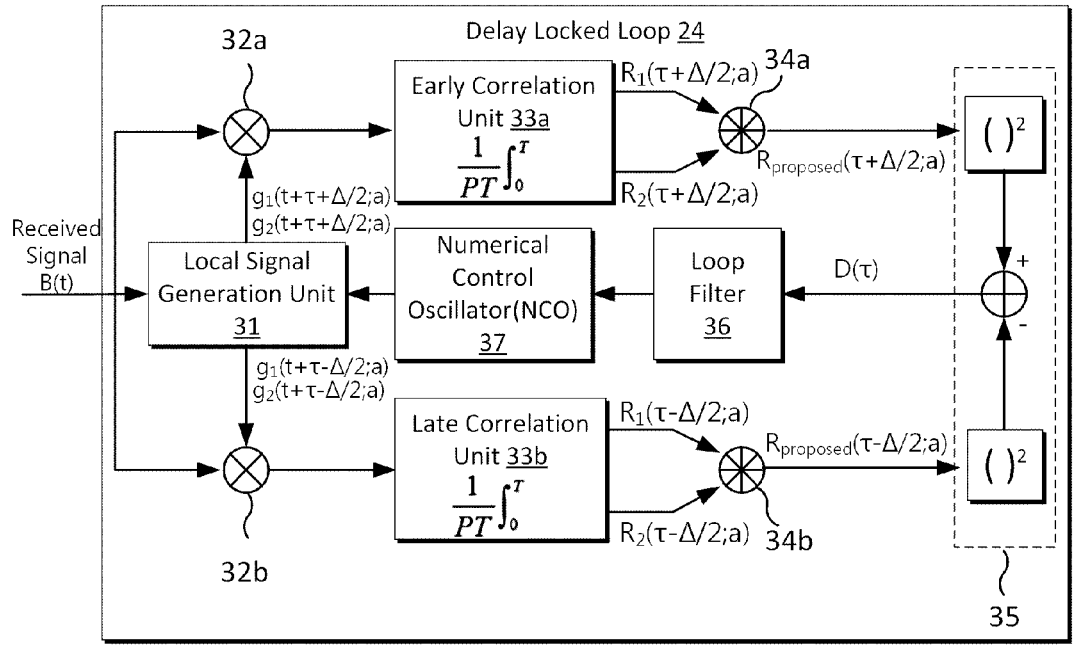
FIG. 3 is a block diagram illustrating the DLL of an apparatus for tracking a BOC signal according to an embodiment of the present invention.

FIG. 3 is a block diagram illustrating the DLL 24 of an apparatus for tracking a BOC signal according to an embodiment of the present invention.

More specifically, the DLL 24 includes a local signal generation unit 31, early and late mixers 32a and 32b, early and late correlation units 33a and 33b, early and late combination units 34a and 34b, a discriminator mixer 35, a loop filter 36, and a numerical control oscillator (NCO) 37.

A conventional apparatus for tracking a BOC signal outputs a priori known spreading code via a local signal generation unit and then performs a correlation operation on the spreading code and a received signal in order to acquire the spreading code of a BOC signal and its synchronization, and performs autocorrelation on the received signal and then finds a pseudo random noise code and a code delay phase for which a correlation value exhibits the highest main peak in order to track code delay after the acquisition.

As described above, the autocorrelation function of the BOC signal has a plurality of side peaks. In order to solve this problem, the local signal generation unit 31 of the present invention outputs a specially shaped local signal pair designed to eliminate side peaks other than a main peak, rather than outputting a delay received signal to be autocorrelated, with regard to a received signal.

In this case, the autocorrelation is an operation that multiplies a signal X and a signal Y while gradually changing the delay time of the signal Y with respect to the signal X. In general, a correlation value in the case where the two signals X and Y are the same or have little difference in phase is considerably larger than those in other cases (that is, a correlation function has a peak shape). Accordingly, if a time delay at which the value of a correlation operation is largest is found, it may be said that the value of the time delay value is the phase delay of the signal Y with respect to the signal X.

In general, there are some techniques for finding the apex of the peak of a correlation function. For example, there is a technique using the type of changes in the values of prompt correlation based on currently applied delay time, early correlation preceding the prompt correlation, and late correlation following the prompt correlation.

For example, if correlation values appear in order of early correlation, prompt correlation and late correlation or in reverse order, the prompt correlation may be viewed as being located on a slope of a peak. If the correlation value of prompt correlation is highest and the values of early correlation and late correlation are lower than the former value, this means that the prompt correlation is located near the apex of a peak.

Generally, if received BOC-modulated signals, that is, $BOC_{sin}(kn,n)$ and $BOC_{cos}(kn,n)$ signals, are B(t), B(t) may be expressed as follows:

$$B(t) = \sqrt{P} \sum_{i=-\infty}^{\infty} e_i p_{T_c}(t - iT_c)d(t)c_i(t) \qquad (1)$$

where P is the power of a BOC-modulated signal, $e_i \in \{-1,1\}$ is the i-th chip of a spreading code having a period T, for example, a PRN code, $T_c$ is the chip period of the spreading code, $p_{T_c}(t)$ is a unit square wave present in $[0,T_c]$, d(t) is navigation data, and $c_i(t)$ is an i-th sub-carrier for BOC modulation.

In this case, it should be noted that for ease of description, the following description will be given on the assumption that d(t)=1 in the case of carried data having substantially significant information based on the fact that a satellite navigation system does not generally provide a separate pilot channel for synchronization.

$c_i(t)$ is the i-th sub-carrier, and may be expressed as the following Equation 2 because N square pulses are present in a single chip of the PRN code:

$$c_i(t) = \sum_{m=0}^{N-1} f_l p_{T_s}(t - iT_c - lT_s) \qquad (2)$$
$$= \sum_{m=0}^{N-1} c_{i,l}(t)$$

where $f_l \in \{-1, 1\}$ is the sign of an l-th square pulse, and $T_s$ is $T_c/N$ and refers to the period of the square pulse.

In a $BOC_{sin}(kn,n)$ signal, for the i-th sub-carrier $c_i(t)$, N and $f_l$ are 2k and $(-1)^{2ki+1}$, respectively. That is, in the $BOC_{sin}(kn, n)$ signal, the i-th sub-carrier $c_i(t)$ may be considered to be equal to a pulse train in which 2k pulses, the sign of each of which is determined to be $(-1)^{2ki+1}$, successively occur, and then the following procedure may be performed.

In a $BOC_{cos}(kn,n)$ signal, for the i-th sub-carrier $c_i(t)$, N and $f_l$ are 4k and $$(-1)^{2ki+1\left\lceil \frac{l}{2} \right\rceil},$$

respectively. In this case, $\lceil x \rceil$ is a ceiling function, and is the largest integer that is not smaller than x.

If a definition is given as $c_{i,l}(t) = f_l p_{T_s}(t-iT_c-lT_s)$ as in Equation 2, each of the pulses constituting $c_i(t)$ may be represented as $c_{i,l}(t)$.

In general, in a correlation function obtained by correlating the BOC-modulated received signal B(t) with the spread code, a plurality of side peaks appears in a main peak in the form of sawteeth, and thus a problem arises in that acquisition and tracking occur in connection with a side peak instead of the main peak, which is called the ambiguity problem.

In the present invention, in order to overcome the ambiguity problem, a correlation function in which a main peak has been left and side peaks have been eliminated is generated. For this purpose, an autocorrelation operation is performed on each of the signals of a newly contrived local signal pair and the received signal B(t) first.

Figure 4:
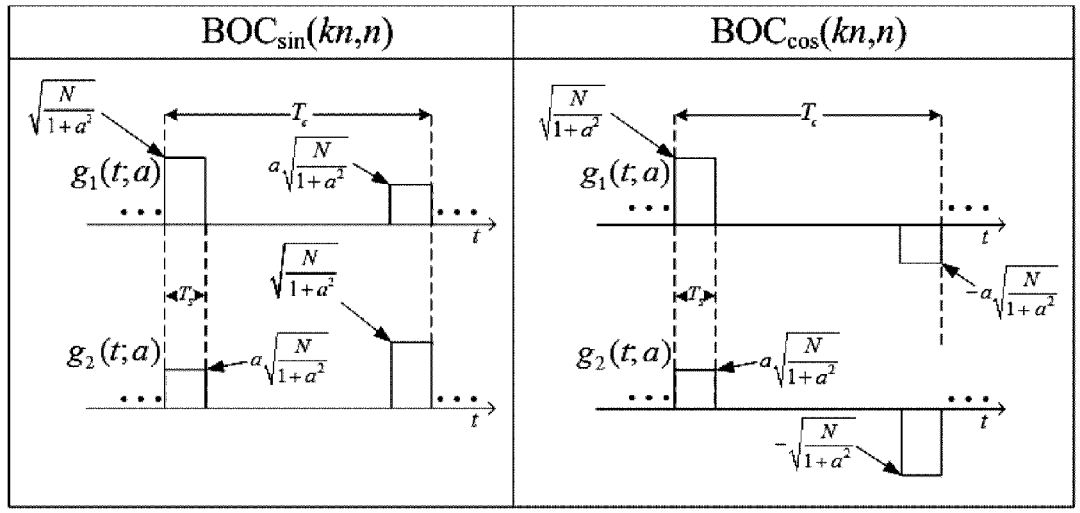
FIG. 4 is a diagram illustrating a new local signal pair for an apparatus for tracking a BOC signal according to an embodiment of the present invention.
Figure 5:
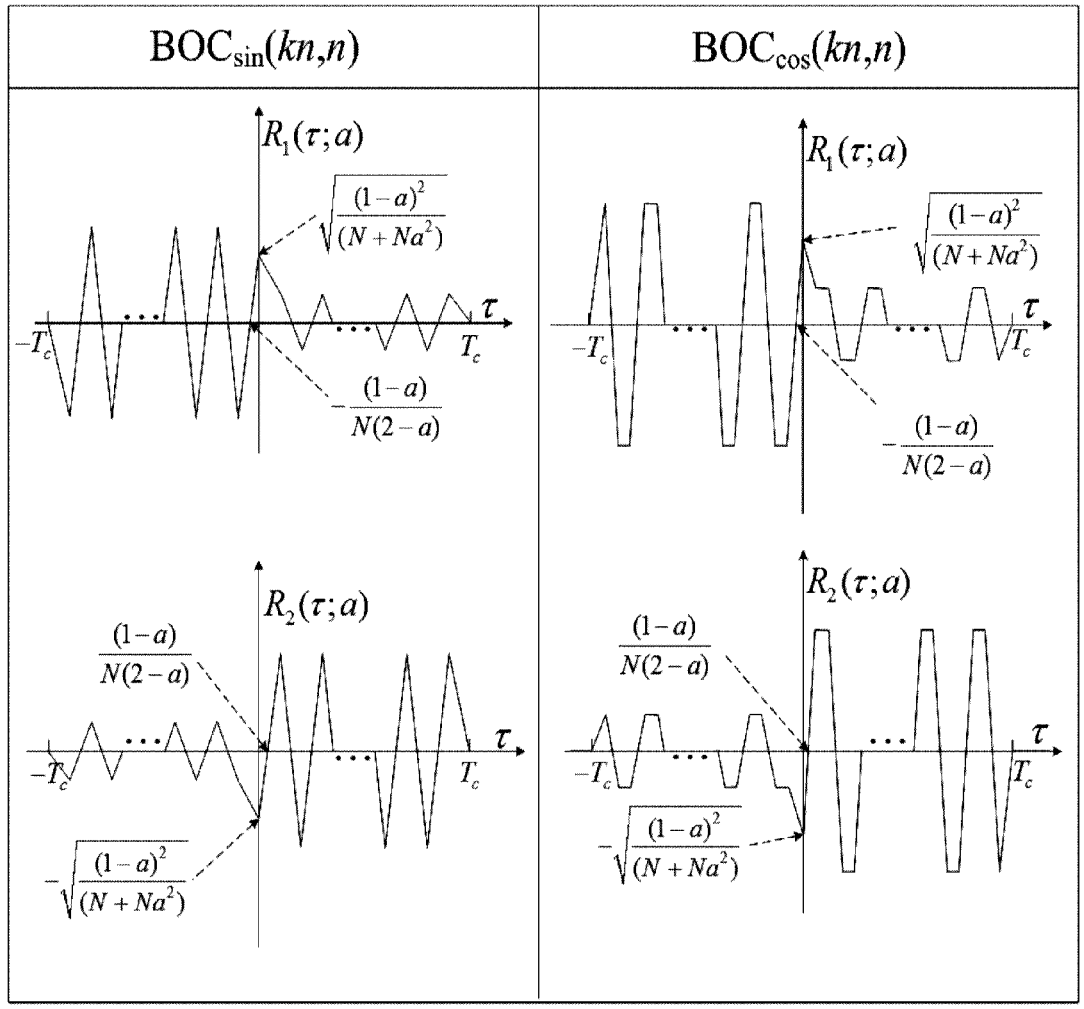
FIG. 5 is a diagram illustrating sub-correlation functions based on new local signals for an apparatus for tracking a BOC signal according to an embodiment of the present invention.

Reference is made to FIG. 4 first in order to describe the newly contrived local signal pair, and then reference is made to FIG. 5 in order to describe corresponding sub-correlation functions.

FIG. 4 is a diagram illustrating a new local signal pair for an apparatus for tracking a BOC signal according to an embodiment of the present invention.

In FIG. 4, a first and second local signal pair $g_1(t;a)$ and $g_2(t;a)$ whose sizes can be adjusted in accordance with a ($0 \le a \le 1$) are illustrated.

With regard to a received signal, the pulse train of the i-th sub-carrier $c_i(t)$ of a $BOC_{sin}(kn,n)$ signal of is characterized in that the sign of a first pulse is always +1 and the sign of a last pulse is always −1 and the pulse train of the i-th sub-carrier $c_i(t)$ of a $BOC_{cos}(kn,n)$ signal is characterized in that the sign of a first pulse is always +1 and the sign of a last pulse is always +1.

Accordingly, if the first and second local signal pair $g_1(t;a)$ and $g_2(t;a)$ are defined using the first and last pulses of a signal pulse train received during an i-th sub-carrier period as in the following Equation 3, a sub-correlation function pair based on the correlation operation of the first and second local signal pair and the received signal B(t) is generated to exhibit a point symmetrical shape. Side peaks can be eliminated and a main peak can be left by combining the sub-correlation function pair:

$$\begin{cases} g_1(t; a) = \sum_{i=-\infty}^{\infty} \sqrt{\dfrac{N}{1+a^2}} (c_{i,0}(t) - ac_{i,N-1}(t)) \\ g_2(t; a) = \sum_{i=-\infty}^{\infty} \sqrt{\dfrac{N}{1+a^2}} (ac_{i,0}(t) - c_{i,N-1}(t)) \end{cases} \qquad (3)$$

where N is the number of pulses during a single sub-carrier period, a is a main peak shape parameter, and $c_{i,0}(t)$ and $c_{i,N-1}(t)$ are first and last pulses, respectively, that constitute a sub-carrier in a single period.

In Equation 3 and FIG. 4, the reason why $$\sqrt{\frac{N}{1+a^2}}$$

is multiplied is to make the sum of the signal powers of the pulses of a newly generated local signal be 1 through the multiplication of the weight.

In FIG. 4, if a received signal B(t) is $BOC_{sin}(kn,n)$, $g_1(t;a)$ appears in the form of a pulse having a size of $$\sqrt{\frac{N}{1+a^2}}$$

at the first pulse location of a received signal pulse train and a pulse having a size of $$a\sqrt{\frac{N}{1+a^2}}$$

at the last pulse location thereof, and $g_2(t;a)$ appears in the form of a pulse having a size of $$a\sqrt{\frac{N}{1+a^2}}$$

at the first pulse location of a received signal pulse train and a pulse having a size of $$\sqrt{\frac{N}{1+a^2}}$$

at the last pulse location thereof.

In contrast, if a received signal B(t) is $BOC_{cos}(kn,n)$, $g_1(t;a)$ appears in the form of a pulse having a size of $$\sqrt{\frac{N}{1+a^2}}$$

at the first pulse location of a received signal pulse train and a pulse having a size of $$-a\sqrt{\frac{N}{1+a^2}}$$

at the last pulse location thereof, and $g_2(t;a)$ appears in the form of a pulse having a size of $$a\sqrt{\frac{N}{1+a^2}}$$

at the first pulse location of a received signal pulse train and a pulse having a size of $$-\sqrt{\frac{N}{1+a^2}}$$

at the last pulse location thereof.

As described above, the first and second local signal pair $g_1(\tau;a)$ and $g_2(\tau;a)$ are generated as pulses having signs and sizes, determined based on the modulation method of a sub-carrier and a given main peak shape parameter a, at the locations of the first and last pulses of the sub-carrier in each period.

When the first and second local signal pair $g_1(\tau;a)$ and $g_2(\tau;a)$ generated as described above are correlated with the received signal B(t), a normalized first and second sub-correlation function pair $R_1(\tau;a)$ and $R_2(\tau;a)$ for an i-th sub-carrier may be expressed as in Equation 4.

In this case, a sub-correlation function refers to a function corresponding to each component when a single main correlation function is separated into individual components constituting the main correlation function. With regard to a sub-correlation function $R_j(\tau;a)$, two components are obtained by correlating a local signal pair with the received signal B(t) in each sub-carrier period. Since a single main correlation function is acquired by combining such two components, such a function is referred to as a sub-correlation function.

$$R_j(\tau, a) = \frac{1}{PT}\int_0^T B(t)g_j(t+\tau, a)dt, \quad j = 1, 2 \qquad (4)$$

where P is the power of the received signal B(t), and T is the period of a pseudo noise code and is considerably longer than the chip period $T_c$ of the pseudo noise code.

The overall distribution of the correlation values of the first and second sub-correlation function pair $R_1(\tau;a)$ and $R_2(\tau;a)$ of Equation 4 varies depending on the received signal B(t). In particular, a point at which $\tau=0$, the width between $\tau=0$ and the closest zero-crossing (a half of the width of a main peak), and the size of a correlation value (the height of the main peak) when $\tau=0$ are determined based on the main peak shape parameter a.

Referring to FIG. 5 in order to illustrate the distribution of the correlation values of the first and second sub-correlation function pair $R_1(\tau;a)$ and $R_2(\tau;a)$, FIG. 5 is a diagram illustrating sub-correlation functions based on a new local signal pair for an apparatus for tracking a BOC signal according to an embodiment of the present invention.

In FIG. 5, when the first and second sub-correlation function pair $R_1(\tau;a)$ and $R_2(\tau;a)$ are overlapped, it can be seen that two curves are symmetrical with respect to the point at which T=0.

In FIG. 5, the peaks of the first and second sub-correlation function pair at the point at which $\tau=0$ are not prominent compared to side peaks. The goal is to generate a main correlation function having only a main peak in such a way as to eliminate side peaks and perform an elimination operation on peaks at the point at which τ=0.

In this case, as will be described in connection with Equation 5, throughout the present specification and the attached claims, an elimination operation refers to an operation related to an algebraic relation in which if real numbers x and y are xy≥0, |x|+|y|−|x−y|=0.

Using such an elimination operation, the remaining waveforms other than center peak segments that will be left as a main peak can be eliminated.

In other words, from the curves of FIG. 5, it can be seen that $R_1(\tau;a) \times R_2(\tau;a) \geq 0$ across the remaining range, other than center peak segments to be left as a main peak, in an overall lateral axis range of a correlation function in which $-T_c \leq \tau \leq T_c$. Accordingly, the remaining waveforms other than center peak segments can be eliminated by performing an elimination operation on $R_1(\tau;a)$ and $R_2(\tau;a)$, as in the following Equation 5:

$$R_{proposed}(\tau,a) = |R_1(\tau,a)| + |R_2(\tau,a)| - |R_1(\tau,a) + R_2(\tau,a)| \tag{5}$$

The main correlation function $R_{proposed}(\tau,a)$ proposed in accordance with Equation 5 exhibits a shape having only a main peak having a width of $$\omega(a) = \frac{2(1-a)T_c}{N(2-a)}$$

and a height of $$h(a) = \sqrt{\frac{4(1-a)^2}{(N+Na^2)}}.$$

Accordingly, the new local signal pair $g_1(t;a)$ and $g_2(t;a)$ of the present invention ultimately leaves only a main peak whose height and width can be adjusted using the value of the main peak shape parameter a and eliminates all side peaks, thereby providing a main correlation function that realizes non-ambiguity.

Figure 6:
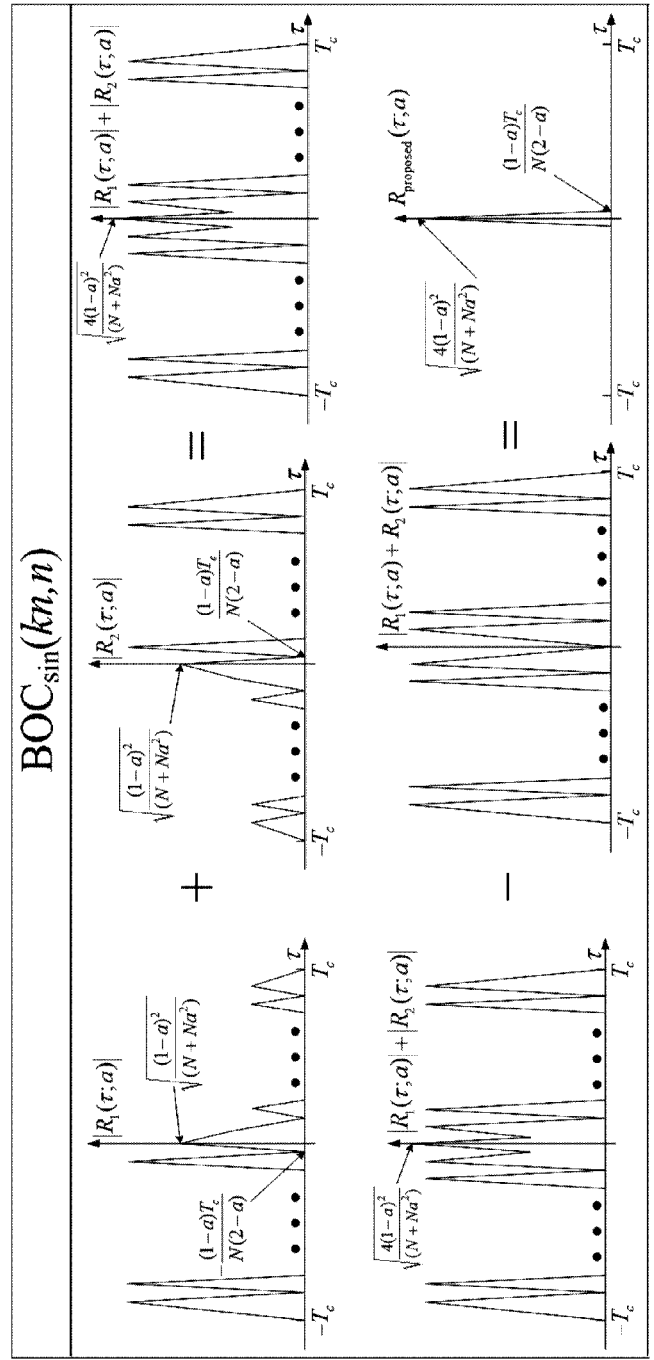
FIGS. 6 and 7 are diagrams illustrating a process of acquiring a main correlation function having only a main peak using the combination of sub-correlation functions for an apparatus for tracking a BOC signal according to an embodiment of the present invention.
Figure 7:
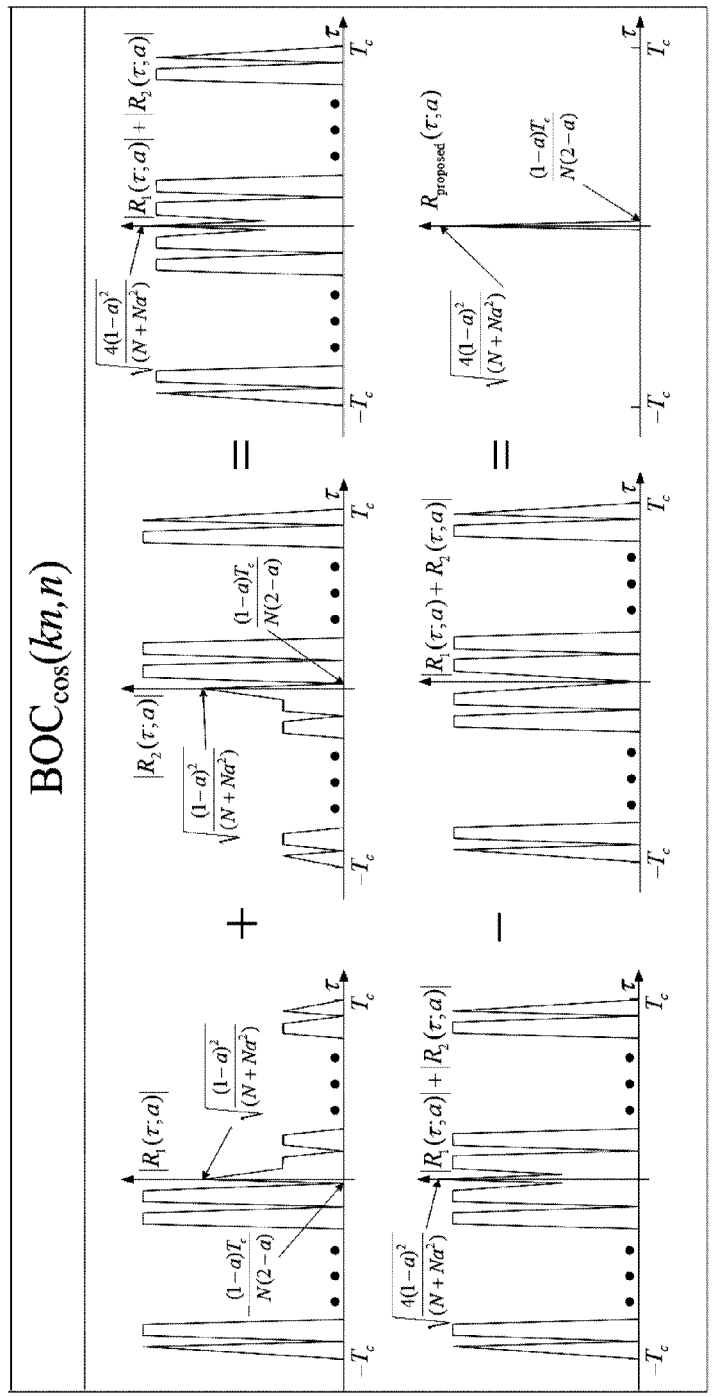

Referring to FIGS. 6 and 7 in order to describe a process of eliminating side peaks, FIGS. 6 and 7 are diagrams illustrating a process of acquiring a main correlation function having only a main peak through the elimination operation of a sub-correlation function pair for an apparatus for tracking a BOC signal according to an embodiment of the present invention.

First, in FIG. 6, by subtracting a waveform obtained by adding $R_1(\tau;a)$ and $R_2(\tau;a)$ and then taking the absolute value of the sum from a waveform obtained by adding the absolute values of $R_1(\tau;a)$ and $R_2(\tau;a)$ obtained by mixing a $BOC_{sin}$(kn,n) received signal with a first and second local signal pair $g_1(t;a)$ and $g_2(t;a)$, only a main peak having a width of $$\omega(a) = \frac{2(1-a)T_c}{N(2-a)}$$

and a height of $$h(a) = \sqrt{\frac{4(1-a)^2}{(N+Na^2)}}$$

is left.

Similarly, in FIG. 7, by subtracting a waveform obtained by adding $R_1(\tau;a)$ and $R_2(\tau;a)$ and then taking the absolute value of the sum from a waveform obtained by adding the absolute values of $R_1(\tau;a)$ and $R_2(\tau;a)$ obtained by mixing a $BOC_{cos}$(kn,n) received signal with a first and second local signal pair $g_1(t;a)$ and $g_2(t;a)$, only a main peak having a width of $$\omega(a) = \frac{2(1-a)T_c}{N(2-a)}$$

and a height of $$h(a) = \sqrt{\frac{4(1-a)^2}{(N+Na^2)}}$$

is left.

The purpose of acquiring a main correlation function having only a main peak is to find the code phase delay value of the first and second local signal pair $g_1(\tau;a)$ and $g_1(\tau;a)$ that enables the correlation value of the input received signal B(t) and the first and second local signal pair $g_1(\tau;a)$ and $g_1(\tau;a)$ to correspond to the apex of a main peak.

When the signal B(t) is received first, there is no a priori information about when chip data in a single period of the sub-carriers of the received signal B(t) starts and ends (that is, a noncoherent state is present), so that the first and second local signal pair $g_1(\tau;a)$ and $g_2(\tau;a)$ are repeatedly generated while the code phase delay value is gradually changed, and are repeatedly correlated with the received signal B(t) until a desired correlation value appears.

When the first and second local signal pair $g_1(\tau;a)$ and $g_2(\tau;a)$ are accurately synchronized with the start and end of sub-carrier pulse trains in a single period, the correlation value of the input received signal B(t) and the first and second local signal pair $g_1(\tau;a)$ and $g_1(\tau;a)$ comes to correspond to the apex of the main peak.

The DLL 24 of the present invention acquires a code phase delay value at which the correlation value corresponds to the apex of the main peak, thereby making the code phase delay of the local code of the local code generation unit 22 for the BOC received signal be 0 and also accurately recovering carried data from the BOC received signal.

Figure 8:
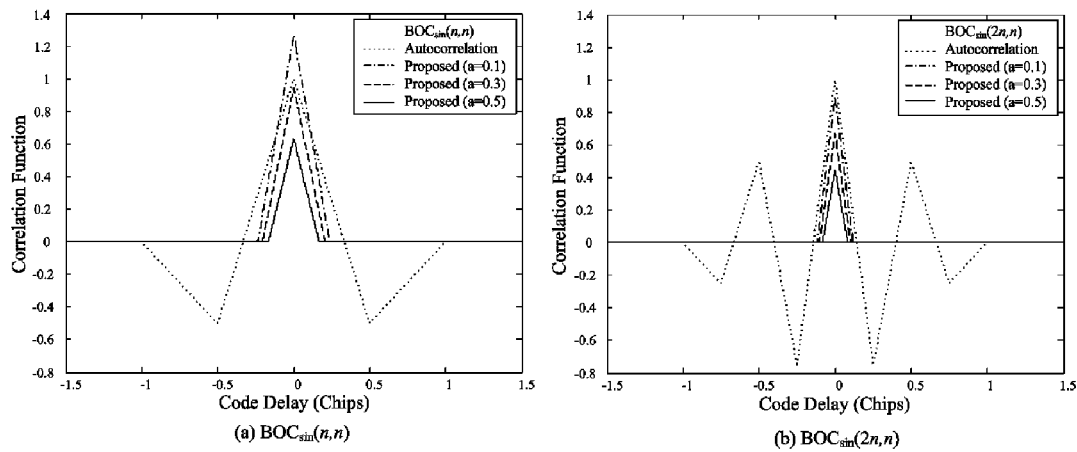
FIGS. 8 and 9 are diagrams illustrating main correlation functions in which only a main peak for an apparatus for tracking a BOC signal according to an embodiment of the present invention has been left.
Figure 9:
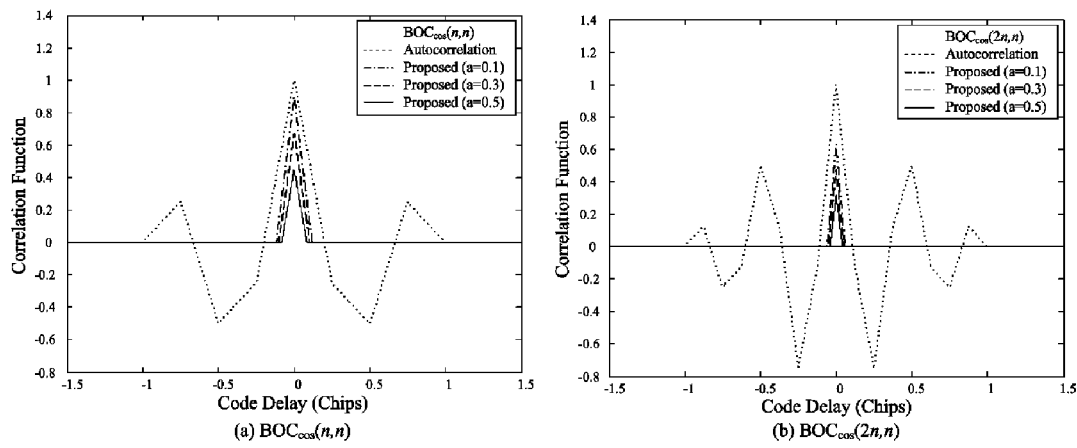

Referring to FIGS. 8 and 9 in order to illustrate the aspect of adjusting the shape of the proposed main correlation function in accordance with the main peak shape parameter a, FIGS. 8 and 9 are diagrams illustrating main correlation functions in each of which only a main peak for an apparatus for tracking a BOC signal according to an embodiment of the present invention has been left.

In FIGS. 8 and 9, with respect to a $BOC_{sin}$(kn,n) signal and a $BOC_{cos}$(kn,n) signal, when k=1 and k=2, the conventional autocorrelation functions are compared with the main correlation functions proposed in the present invention.

Since the conventional DLL correlates a local code, identical to a PRN code used to modulate the received signal B(t), with the received signal B(t), an original theoretical autocorrelation function is acquired, and this autocorrelation function has not only a main peak but also side peaks.

In contrast, in accordance with the main correlation functions that are proposed in the present invention and that have peak shapes whose widths and heights are adjusted based on the main peak shape parameter a, all side peaks disappear and only main peaks are left, and also the shapes of the main peaks can be adjusted based on the value of the main peak shape parameter a as desired.

When the main peak shape parameter a is smaller, a higher main peak can be acquired. As k increases, the height of the main peak decreases. In this case, the main peak may be increased by decreasing the main peak shape parameter a.

Referring back to FIG. 3, the DLL 24 using the local signal pair and the main correlation function is described in greater detail.

In general, the DLL 24 determines whether two correlation values based on an early delay value preceding a desired delay value and a late delay value following the desired delay value have passed the apex of a main peak while driving a loop while gradually changing the delay values based on the two correlation values to which the early delay value and the late delay value have been applied.

In greater detail, for example, when a delay value is gradually changed from −1 chip to +1 chip, an early correlation value based on an early local signal pair based on an early delay value larger than a current delay value reaches the left slope of a main peak and passes the apex of the main peak earlier than a late correlation value based a late local signal pair based on a late delay value smaller than the current delay value.

If the difference between the early correlation value and the late correlation value is tracked, the difference will continue to have a positive value, will gradually decrease from the point where the early correlation value passes the apex of the main peak when the early correlation value is located on the left slope of the main peak, will become 0 when the early correlation value and the late correlation value are symmetrical with respect to the apex, and will have a negative value when the early correlation value further proceed to the right slope of the main peak.

Through this observation, it may be said that the prompt correlation value reaches the apex at a point where the difference between the early correlation value and the late correlation value passes 0, that is, a zero-crossing point.

A discrimination function capable of discriminating the state of a prompt correlation value, such as the difference between the early correlation value and the late correlation value, is generally referred to as a discriminator. Although a discrimination function for a discriminator may be contrived in various manners, a discrimination function $D(\tau)$, such as Equation 6, may be employed:

$$D(\tau) = R_{proposed}^2\left(\tau + \frac{\Delta}{2}; a\right) - R_{proposed}^2\left(\tau - \frac{\Delta}{2}; a\right) \tag{6}$$

That is, if a change in a value obtained by subtracting the square of the result of the late main correlation function from the square of the result of the early main correlation function is tracked using such a discrimination function and then zero crossing is detected, it may be determined that the main correlation function has reached the apex of the main peak at the delay value.

Next, the operation of the DLL 24 is described based on the discussion so far set forth.

First, the local signal generation unit 31 generates an early local signal pair $$g_1\left(t+\tau+\frac{\Delta}{2}; a\right) \text{ and } g_2\left(t+\tau+\frac{\Delta}{2}; a\right)$$

and a late local signal pair $$g_1\left(t+\tau-\frac{\Delta}{2}; a\right) \text{ and } g_2\left(t+\tau-\frac{\Delta}{2}; a\right)$$

having a phase delay value $\tau$ and a delay value difference $\Delta$ using the first and last pulses of a signal pulse train, received during a single period of a sub-carrier of a BOC modulated received signal B(t), in which N pulses successively occur in a single period $T_c$ of a spreading code chip, and a given main peak shape parameter a, based on a first and second local signal pair $g_1(\tau;a)$ and $g_2(\tau;a)$ defined in accordance with Equation 3, and provides the early local signal pair $$g_1\left(t+\tau+\frac{\Delta}{2}; a\right) \text{ and } g_2\left(t+\tau+\frac{\Delta}{2}; a\right)$$

and the late local signal pair $$g_1\left(t+\tau-\frac{\Delta}{2}; a\right) \text{ and } g_2\left(t+\tau-\frac{\Delta}{2}; a\right)$$

to the early and late mixers 32a and 32b, respectively.

The early and late mixers 32a and 32b output early and late mixing signal pairs, obtained by multiplying the received signal B(t) by the early local signal pair $$g_1\left(t+\tau+\frac{\Delta}{2}; a\right) \text{ and } g_2\left(t+\tau+\frac{\Delta}{2}; a\right)$$

and the late local signal pair $$g_1\left(t+\tau-\frac{\Delta}{2}; a\right) \text{ and } g_2\left(t+\tau-\frac{\Delta}{2}; a\right),$$

to the early and late correlation units 33a and 33b, respectively.

The early and late correlation units 33a and 33b generate an early sub-correlation function pair $$R_1\left(\tau+\frac{\Delta}{2}; a\right) \text{ and } R_2\left(\tau+\frac{\Delta}{2}; a\right)$$

and a late sub-correlation function pair $$R_1\left(\tau-\frac{\Delta}{2}; a\right) \text{ and } R_2\left(\tau-\frac{\Delta}{2}; a\right)$$

by performing the correlation operations of the early and late mixing signal pairs with respect to the total time T, as in Equation 4.

The early and late combination units 34a and 34b generate an early main correlation function $$R_{proposed}\left(\tau + \frac{\Delta}{2}; a\right)$$

and a late main correlation function $$R_{proposed}\left(\tau - \frac{\Delta}{2}; a\right)$$

by performing elimination operations on the early sub-correlation function pair $$R_1\left(\tau + \frac{\Delta}{2}; a\right) \text{ and } R_2\left(\tau + \frac{\Delta}{2}; a\right)$$

and the late sub-correlation function pair $$R_1\left(\tau - \frac{\Delta}{2}; a\right) \text{ and } R_2\left(\tau - \frac{\Delta}{2}; a\right)$$

as in Equation 5.

The proposed main correlation function $R_{proposed}(\tau;a)$ exhibits a shape having only a main peak having a width of $$\omega(a) = \frac{2(1-a)T_c}{N(2-a)}$$

and a height of $$h(a) = \sqrt{\frac{4(1-a)^2}{(N+Na^2)}}.$$

The discriminator mixer 35 outputs a discrimination output value obtained by subtracting the square of the late main correlation function $$R_{proposed}\left(\tau - \frac{\Delta}{2}; a\right)$$

from the square of the early main correlation function $$R_{proposed}\left(\tau + \frac{\Delta}{2}; a\right),$$

as in Equation 6.

The loop filter 36 may filter out the noise component of the discrimination output of the discriminator mixer 35.

The NCO 37 determines the phase delay value τ of a first and second local signal pair $g_1(t+\tau;a)$ and $g_2(t+\tau;a)$ for the received signal based on the filtered discrimination output, and outputs the determined phase delay value τ to the local signal generation unit 31.

For example, the NCO 37 may increase the phase delay value τ by a predetermined interval and then output the increased phase delay value τ to the local signal generation unit 31, on the ground that if the discrimination output is a positive value larger than a predetermined threshold value, this means that an early correlation value is larger than a late correlation value and also means that the applied phase delay value τ is smaller than phase delay corresponding to the apex of a main peak in light of the shape of the main peak of a main correlation function.

Furthermore, if it is determined that the main correlation function value based on the phase delay value τ is located at the apex of the main peak based on the filtered discrimination output, the NCO 37 outputs the phase delay value τ at the time to the local code generation unit 22 as a code phase delay value.

Figure 10:
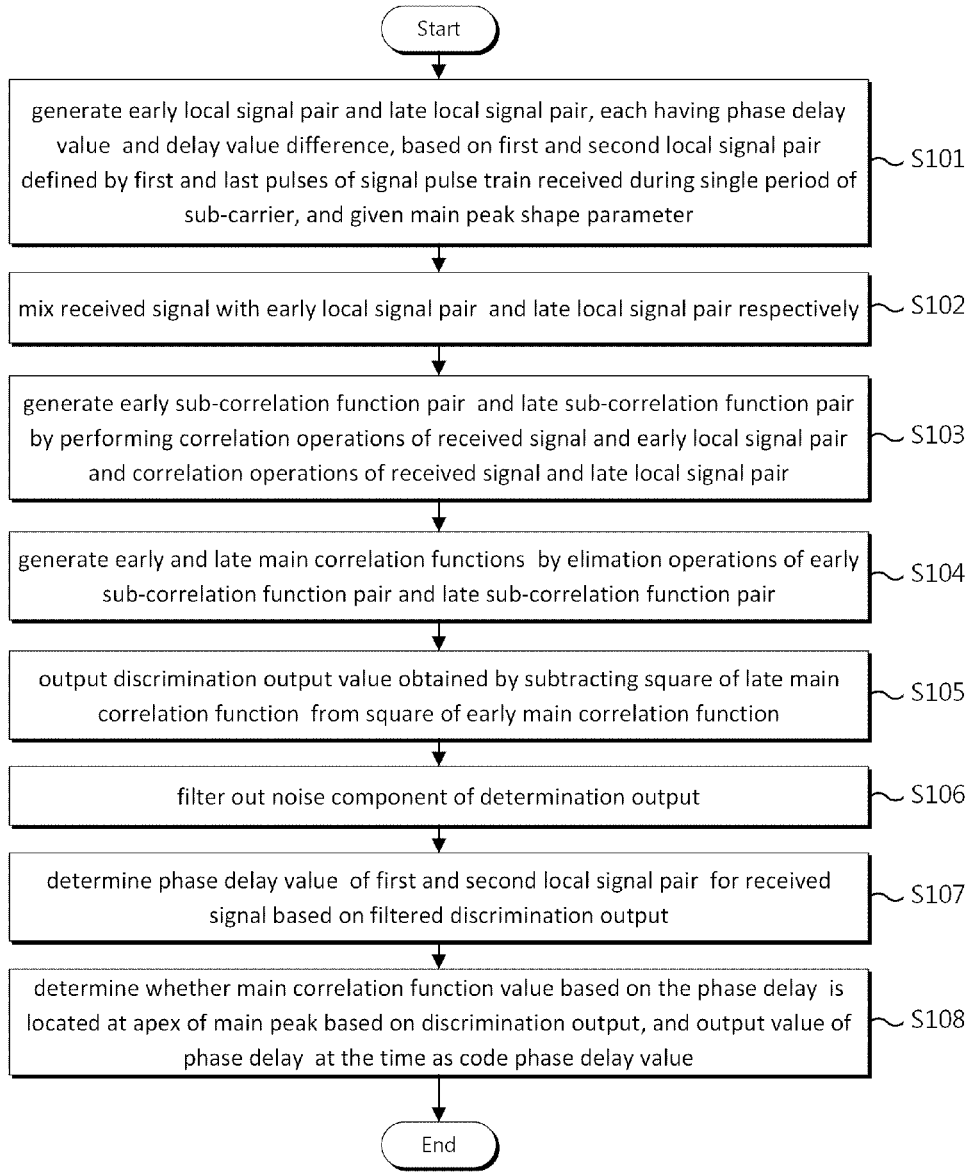
FIG. 10 is a flowchart illustrating a method of tracking a BOC signal according to another embodiment of the present invention.

FIG. 10 is a flowchart illustrating a method of tracking a BOC signal according to another embodiment of the present invention.

At step S101, early local signal pair $$g_1\left(t+\tau+\frac{\Delta}{2}; a\right) \text{ and } g_2\left(t+\tau+\frac{\Delta}{2}; a\right)$$

and late local signal pair $$g_1\left(t+\tau-\frac{\Delta}{2}; a\right) \text{ and } g_2\left(t+\tau-\frac{\Delta}{2}; a\right),$$

each having phase delay value τ and delay value difference Δ, are respectively generated based on first and second local signal pair $g_1(\tau;a)$ and $g_2(\tau;a)$ defined by first and last pulses of signal pulse train, received during single period of sub-carrier, and given main peak shape parameter a, according to Equation 3.

At step S102, received signal B(t) is mixed with early local signal pair $$g_1\left(t+\tau+\frac{\Delta}{2}; a\right) \text{ and } g_2\left(t+\tau+\frac{\Delta}{2}; a\right)$$

and late local signal pair $$g_1\left(t+\tau-\frac{\Delta}{2}; a\right) \text{ and } g_2\left(t+\tau-\frac{\Delta}{2}; a\right),$$

respectively to generated early and late mixed signal pairs.

At step S103, correlation operations of the early and late mixed signal pairs with respect to a total time T are performed. That is, early sub-correlation function pair $$R_1\left(\tau + \frac{\Delta}{2}; a\right) \text{ and } R_2\left(\tau + \frac{\Delta}{2}; a\right)$$

and late sub-correlation function pair $$R_1\left(\tau - \frac{\Delta}{2}; a\right) \text{ and } R_2\left(\tau - \frac{\Delta}{2}; a\right)$$

are generated by performing correlation operations of received signal B(t) and early local signal pair $$g_1\left(t + \tau + \frac{\Delta}{2}; a\right) \text{ and } g_2\left(t + \tau + \frac{\Delta}{2}; a\right)$$

and correlation operations of received signal B(t) and late local signal pair $$g_1\left(t + \tau - \frac{\Delta}{2}; a\right) \text{ and } g_2\left(t + \tau - \frac{\Delta}{2}; a\right).$$

At step S104, early main correlation function $$R_{proposed}\left(\tau + \frac{\Delta}{2}; a\right)$$

and late main correlation function $$R_{proposed}\left(\tau - \frac{\Delta}{2}; a\right)$$

are generated respectively by elimination operation of early sub-correlation function pair $$R_1\left(\tau + \frac{\Delta}{2}; a\right) \text{ and } R_2\left(\tau + \frac{\Delta}{2}; a\right)$$

and elimination operation of late sub-correlation function pair $$R_1\left(\tau - \frac{\Delta}{2}; a\right) \text{ and } R_2\left(\tau - \frac{\Delta}{2}; a\right),$$

according to Equation 5.

The proposed main correlation functions $$R_{proposed}\left(\tau + \frac{\Delta}{2}; a\right) \text{ and } R_{proposed}\left(\tau - \frac{\Delta}{2}; a\right)$$

exhibit respectively shapes having only a main peak having a width of $$\omega(a) = \frac{2(1-a)T_c}{N(2-a)}$$

and a height of $$h(a) = \sqrt{\frac{4(1-a)^2}{(N + Na^2)}}.$$

At step S105, a discrimination output value is obtained by subtracting the square of the late main correlation function $$R_{proposed}\left(\tau - \frac{\Delta}{2}; a\right)$$

from the square of the early main correlation function $$R_{proposed}\left(\tau + \frac{\Delta}{2}; a\right),$$

as in Equation 6.

At selective step S106, the noise component of the discrimination output may be filtered out.

At step S107, the phase delay value $\tau$ for the first and second local signal pair $g_1(\tau;a)$ and $g_2(\tau;a)$ is determined based on the filtered discrimination output.

Furthermore, at step S108, if it is determined that the main correlation function value based on the phase delay value $\tau$ is located at the apex of a main peak based on the filtered discrimination output, the phase delay value $\tau$ at the time is output as a code phase delay value.

If such a determination is made at step S108, the phase delay value $\tau$ at the time is output as a code phase delay value.

Figure 11:
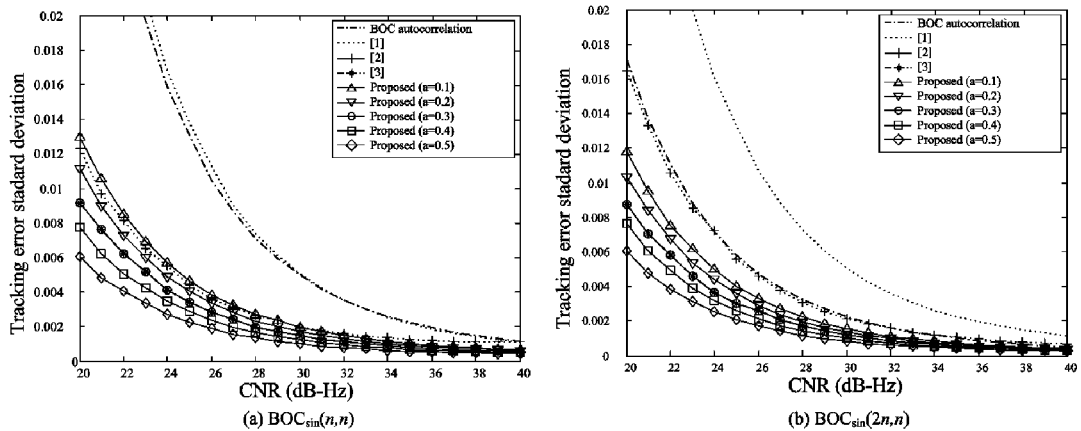
FIGS. 11 and 12 are graphs illustrating the performance of the apparatus and method for tracking a BOC signal according to the embodiments of the present invention.
Figure 12:
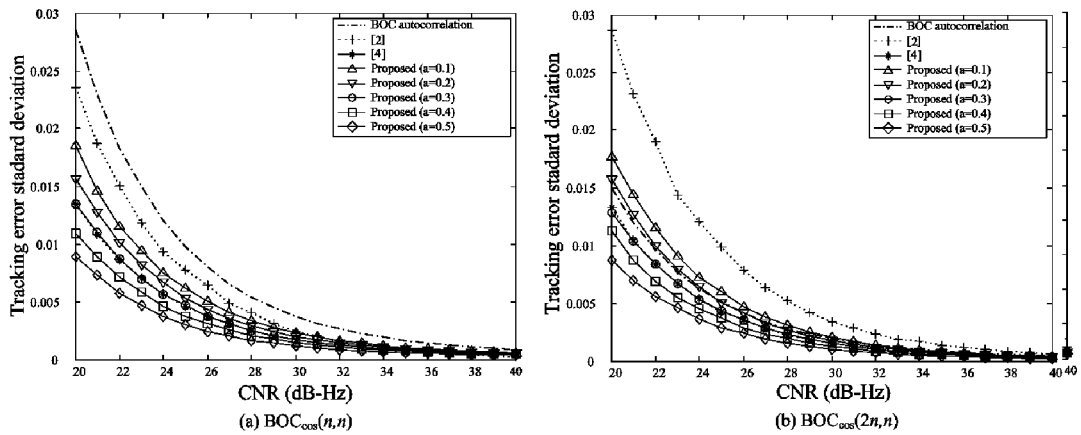

FIGS. 11 and 12 are graphs illustrating the performance of an apparatus and method for tracking a BOC signal according to embodiments of the present invention.

Referring to FIG. 11, in order to compare the conventional BOC signal tracking techniques ([1], [2], and [3]) introduced in the section "Non-patent Documents" with the technique using a novel local signal and a main correlation function proposed in the present invention with respect to a $BOC_{sin}$ (kn,n) signal when k=1 and k=2, curves for tracking error standard deviation (TESD) versus carrier-to-noise ratio (CNR) are plotted for the respective techniques.

In the method proposed in the present invention, the main peak shape parameter a is given as 0.1, 0.2, 0.3, 0.4 and 0.5.

When k=1 and k=2, with respect to all the values of the main peak shape parameter a, the method of the present invention exhibited excellent results compared to the auto-correlation function technique.

When k=1, the method of the present invention exhibited excellent results compared to the conventional BOC signal tracking techniques in the case where the value of the main peak shape parameter a was equal to or larger than 0.4, and exhibited a similar or excellent result in the case where the value of the main peak shape parameter a was smaller than 0.4.

When k=2, the method of the present invention exhibited excellent results compared to the conventional BOC signal tracking techniques in the case where the value of the main peak shape parameter a was equal to or larger than 0.4, and exhibited a similar or partially excellent result in the case where the value of the main peak shape parameter a was smaller than 0.4.

Furthermore, referring to FIG. 12, in order to compare the conventional BOC signal tracking technique [2] applicable to a $BOC_{cos}(kn,n)$ signal among the conventional BOC signal tracking techniques introduced in the section "Non-patent Documents" with the technique using a novel local signal and a main correlation function proposed in the present invention when k=1 and k=2 with respect to the $BOC_{cos}(kn,n)$ signal, curves for tracking error standard deviation (TESD) versus carrier-to-noise ratio (CNR) are plotted for the respective techniques.

In the technique proposed in the present invention, the main peak shape parameter a is given as 0.1, 0.2, 0.3 and 0.4.

When k=1, with respect to all the values of the main peak shape parameter a, the technique of the present invention exhibited excellent results compared to the autocorrelation function technique and the conventional BOC signal tracking techniques.

When k=2, the technique of the present invention exhibited excellent results compared to the autocorrelation function technique and the conventional BOC signal tracking techniques in the case where the value of the main peak shape parameter a was equal to or larger than 0.3, and exhibited similar or partially excellent results in the case where the value of the main peak shape parameter a was smaller than 0.3.

The above embodiments and the accompanying drawings are intended merely to clearly illustrate part of the technical spirit of the present invention, and it will be apparent to those skilled in the art that modifications and specific embodiments that those skilled in the art can easily derive from the present specification and the accompanying drawings are all included in the range of the rights of the present invention.

Furthermore, the apparatus according to the present invention may be implemented as computer-readable code stored on a computer-readable storage medium. The computer-readable storage medium includes all types of storage devices on which data that can be read by a computer system can be stored. Examples of the storage medium include ROM, RAM, an optical disk, magnetic tape, a floppy disk, hard disk, nonvolatile memory. Furthermore, the computer-readable medium may be distributed across a computer system connected over a network, and thus computer-readable code may be stored and executed in a distributed manner.

What is claimed is:

1. A delay lock loop (DLL) for tracking a code phase delay value for a local code to be correlated with a received cosine or sine binary offset carrier (BOC)-modulated signal, in which N pulses successively occur in a single period $T_c$ of a spreading code chip, in a spread spectrum signal receiver system, the DLL comprising:
   a local signal generation unit configured to generate an early local signal pair $$g_1\left(t+\tau+\frac{\Delta}{2};a\right) \text{ and } g_2\left(t+\tau+\frac{\Delta}{2};a\right)$$

and a late local signal pair $$g_1\left(t+\tau-\frac{\Delta}{2};a\right) \text{ and } g_2\left(t+\tau-\frac{\Delta}{2};a\right)$$

each having a phase delay value $\tau$ and a delay value difference $\Delta$ based on a first and second local signal pair $g_1(\tau;a)$ and $g_2(\tau;a)$ defined by first and last pulses of a signal pulse train, received during a single period of a sub-carrier of the received signal, and a given main peak shape parameter a;

early and late correlation units configured to generate an early sub-correlation function pair $$R_1\left(\tau+\frac{\Delta}{2};a\right) \text{ and } R_2\left(\tau+\frac{\Delta}{2};a\right)$$

and a late sub-correlation function pair $$R_1\left(\tau-\frac{\Delta}{2};a\right) \text{ and } R_2\left(\tau-\frac{\Delta}{2};a\right)$$

by performing correlation operations of the early and late mixing signal pairs with respect to a total time $T(0 \le t \le T)$;
   early and late combination units configured to generate an early main correlation function $$R_{proposed}\left(\tau+\frac{\Delta}{2};a\right)$$

and a late main correlation function $$R_{proposed}\left(\tau-\frac{\Delta}{2};a\right)$$

each having a main peak by performing elimination operations on the early sub-correlation function pair and the late sub-correlation function pair; and
   a numerical control oscillator (NCO) configured to determine a phase delay value $\tau$ of a first and second local signal pair for the received signal based on a filtered discrimination output, and to output the determined phase delay value $\tau$ to the local signal generation unit,
   wherein the elimination operation is an operation that satisfies $|x|+|y|-|x-y|=0$ for real numbers x and y, and
   wherein $T_c$, t and T comprise positive real numbers, and N comprises a positive integer.

2. The DLL of claim 1, wherein the first and second local signal pair $g_1(t;a)$ and $g_2(t;a)$ are defined by first and last pulses $c_{i,0}(t)$ and $c_{i,N-1}(t)$ of N pulses, constituting a signal pulse train received during an i-th sub-carrier period of the received signal, and a main peak shape parameter a in accordance with the following equations:

$$\begin{cases} g_1(t;a) = \sum_{i=-\infty}^{\infty} \sqrt{\frac{N}{1+a^2}}\, (c_{i,0}(t) - ac_{i,N-1}(t)), \\ g_2(t;a) = \sum_{i=-\infty}^{\infty} \sqrt{\frac{N}{1+a^2}}\, (ac_{i,0}(t) - c_{i,N-1}(t)) \end{cases}$$

3. The DLL of claim 1, wherein if the BOC modulated received signal is $BOC_{sin}(kn,n)$,
   $g_1(t;a)$ appears in a form of a pulse having a size of $$\sqrt{\frac{N}{1+a^2}}$$

at a location of the first pulse of the received signal pulse train and a pulse having a size of $$a\sqrt{\frac{N}{1+a^2}}$$

at a location of the last pulse thereof; and
$g_2(t;a)$ appears in a form of a pulse having a size of $$a\sqrt{\frac{N}{1+a^2}}$$

at a location of the first pulse of the received signal pulse train and a pulse having a size of $$\sqrt{\frac{N}{1+a^2}}$$

at a location of the last pulse thereof,
wherein k is a positive integer corresponding to a ratio of a chip period of a pseudo random noise (PRN) code to the period of a sub-carrier, and n corresponds to a ratio of a PRN code chip transmission rate to 1.023 MHz comprising a clock frequency of a C/A (Coarse/Acquisition) code.

4. The DLL of claim 1, wherein if a received signal B(t) is $BOC_{cos}(kn,n)$,
$g_1(t;a)$ appears in a form of a pulse having a size of $$\sqrt{\frac{N}{1+a^2}}$$

at a location of the first pulse of the received signal pulse train and a pulse having a size of $$-a\sqrt{\frac{N}{1+a^2}}$$

at a location of the last pulse thereof; and
$g_2(t;a)$ appears in a form of a pulse having a size of $$a\sqrt{\frac{N}{1+a^2}}$$

at a location of the first pulse of the received signal pulse train and a pulse having a size of $$-\sqrt{\frac{N}{1+a^2}}$$

at a location of the last pulse thereof,
wherein k is a positive integer corresponding to a ratio of a chip period of a PRN (pseudo random noise) code to the period of a sub-carrier, and n corresponds to a ratio of a PRN code chip transmission rate to 1.023 MHz comprising a clock frequency of a C/A (Coarse/Acquisition) code.

5. The DLL of claim 1, wherein the early main correlation function $$R_{proposed}\left(\tau + \frac{\Delta}{2}; a\right)$$

and the late main correlation function $$R_{proposed}\left(\tau - \frac{\Delta}{2}; a\right)$$

are generated to each have a waveform having only a main peak having a width of $$\frac{2(1-a)T_c}{N(2-a)}$$

and a height of $$\sqrt{\frac{4(1-a)^2}{(N+Na^2)}}$$

by combining the early sub-correlation function pair and the late sub-correlation function pair.

6. The DLL of claim 1, wherein:
the early main correlation function $$R_{proposed}\left(\tau + \frac{\Delta}{2}; a\right)$$

has a waveform obtained by subtracting a waveform obtained by taking an absolute value of a sum of $$R_1\left(\tau + \frac{\Delta}{2}; a\right) \text{ and } R_2\left(\tau + \frac{\Delta}{2}; a\right)$$

from a waveform obtained by adding an absolute value of $$R_1\left(\tau + \frac{\Delta}{2}; a\right)$$

and an absolute value of $$R_2\left(\tau + \frac{\Delta}{2}; a\right),$$

with respect to the early sub-correlation function pair; and the late main correlation function $$R_{proposed}\left(\tau - \frac{\Delta}{2}; a\right)$$

has a waveform obtained by subtracting a waveform obtained by taking an absolute value of a sum of $$R_1\left(\tau - \frac{\Delta}{2}; a\right) \text{ and } R_2\left(\tau - \frac{\Delta}{2}; a\right)$$

from a waveform obtained by adding an absolute value of $$R_1\left(\tau - \frac{\Delta}{2}; a\right)$$

and an absolute value of $$R_2\left(\tau - \frac{\Delta}{2}; a\right),$$

with respect to the late sub-correlation function pair.

7. The DLL of claim 1, wherein a discrimination function $D(\tau)$ is selected to determine whether a value of the main correlation function based on the phase delay value $\tau$ is located at an apex of the main peak based on the discrimination output.

8. The DLL of claim 7, wherein the discrimination function $D(\tau)$ is defined by the following Equation:

$$D(\tau) = R_{proposed}^2\left(\tau + \frac{\Delta}{2}; a\right) - R_{proposed}^2\left(\tau - \frac{\Delta}{2}; a\right).$$

9. The DLL of claim 8, wherein the code phase delay value for the local code is determined to be a phase delay value $\tau$ when a zero-crossing of the discrimination function $D(\tau)$ is detected.

10. A binary offset carrier (BOC) signal tracking method for tracking a code phase delay value for a local code to be correlated with a received cosine or sine BOC-modulated signal, in which N pulses successively occur in a single period $T_c$ of a spreading code chip, in a spread spectrum signal receiver system, the method comprising:

generating an early local signal pair $$g_1\left(t + \tau + \frac{\Delta}{2}; a\right) \text{ and } g_2\left(t + \tau + \frac{\Delta}{2}; a\right)$$

and a late local signal pair $$g_1\left(t + \tau - \frac{\Delta}{2}; a\right) \text{ and } g_2\left(t + \tau - \frac{\Delta}{2}; a\right)$$

each having a phase delay value $\tau$ and a delay value difference $\Delta$ based on a first and second local signal pair $g_1(\tau;a)$ and $g_2(\tau;a)$ defined by first and last pulses of a signal pulse train, received during a single period of a sub-carrier of the received signal, and a given main peak shape parameter a;

generating an early sub-correlation function pair $$R_1\left(\tau + \frac{\Delta}{2}; a\right) \text{ and } R_2\left(\tau + \frac{\Delta}{2}; a\right)$$

and a late sub-correlation function pair $$R_1\left(\tau - \frac{\Delta}{2}; a\right) \text{ and } R_2\left(\tau - \frac{\Delta}{2}; a\right)$$

by performing correlation operations of the early and late mixing signal pairs with respect to a total time $T(0 \le t \le T)$;

generating an early main correlation function $$R_{proposed}\left(\tau + \frac{\Delta}{2}; a\right)$$

and a late main correlation function $$R_{proposed}\left(\tau - \frac{\Delta}{2}; a\right)$$

each having a main peak by performing elimination operations on the early sub-correlation function pair and the late sub-correlation function pair; and determining a phase delay value $\tau$ of a first and second local signal pair for the received signal based on a filtered discrimination output, and outputting the determined phase delay value $\tau$, wherein the elimination operation is an operation that satisfies $|x|+|y|-|x-y|=0$ for real numbers x and y, and wherein $T_c$, t and T comprise positive real numbers, and N comprises a positive integer.

11. The method of claim 10, wherein the first and second local signal pair $g_1(t;a)$ and $g_2(t;a)$ are defined by first and last pulses $c_{i,0}(t)$ and $c_{i,N-1}(t)$ of N pulses, constituting a signal pulse train received during an i-th sub-carrier period of the received signal, and a main peak shape parameter a in accordance with the following equations:

$$\begin{cases} g_1(t; a) = \sum_{i=-\infty}^{\infty} \sqrt{\frac{N}{1+a^2}} \, (c_{i,0}(t) - ac_{i,N-1}(t)), \\ g_2(t; a) = \sum_{i=-\infty}^{\infty} \sqrt{\frac{N}{1+a^2}} \, (ac_{i,0}(t) - c_{i,N-1}(t)) \end{cases}$$

12. The method of claim 10, wherein if the BOC modulated received signal is $BOC_{sin}(kn,n)$, $g_1(t;a)$ appears in a form of a pulse having a size of $$\sqrt{\frac{N}{1+a^2}}$$

at a location of the first pulse of the received signal pulse train and a pulse having a size of $$a\sqrt{\frac{N}{1+a^2}}$$

at a location of the last pulse thereof; and $g_2(t;a)$ appears in a form of a pulse having a size of $$a\sqrt{\frac{N}{1+a^2}}$$

at a location of the first pulse of the received signal pulse train and a pulse having a size of $$\sqrt{\frac{N}{1+a^2}}$$

at a location of the last pulse thereof, wherein k is a positive integer corresponding to a ratio of a chip period of a pseudo random noise (PRN) code to the period of a sub-carrier, and n corresponds to a ratio of a PRN code chip transmission rate to 1.023 MHz comprising a clock frequency of a C/A (Coarse/Acquisition) code.

13. The method of claim 10, wherein if a received signal B(t) is $BOC_{cos}(kn,n)$, $g_1(t; a)$ appears in a form of a pulse having a size of $$\sqrt{\frac{N}{1+a^2}}$$

at a location of the first pulse of the received signal pulse train and a pulse having a size of $$-a\sqrt{\frac{N}{1+a^2}}$$

at a location of the last pulse thereof; and $g_2(t; a)$ appears in a form of a pulse having a size of $$a\sqrt{\frac{N}{1+a^2}}$$

at a location of the first pulse of the received signal pulse train and a pulse having a size of $$-\sqrt{\frac{N}{1+a^2}}$$

at a location of the last pulse thereof, wherein k is a positive integer corresponding to a ratio of a chip period of a pseudo random noise (PRN) code to the period of a sub-carrier, and n corresponds to a ratio of a PRN code chip transmission rate to 1.023 MHz comprising a clock frequency of a C/A (Coarse/Acquisition) code.

14. The method of claim 10, wherein the early main correlation function $$R_{proposed}\left(\tau + \frac{\Delta}{2}; a\right)$$

and the late main correlation function $$R_{proposed}\left(\tau - \frac{\Delta}{2}; a\right)$$

are generated to each have a waveform having only a main peak having a width of $$\frac{2(1-a)T_c}{N(2-a)}$$

and a height of $$\sqrt{\frac{4(1-a)^2}{(N+Na^2)}}$$

by combining the early sub-correlation function pair and the late sub-correlation function pair.

15. The method of claim 10, wherein:

the early main correlation function $$R_{proposed}\left(\tau + \frac{\Delta}{2}; a\right)$$

has a waveform obtained by subtracting a waveform obtained by taking an absolute value of a sum of $$R_1\left(\tau + \frac{\Delta}{2}; a\right) \text{ and } R_2\left(\tau + \frac{\Delta}{2}; a\right)$$

from a waveform obtained by adding an absolute value of $$R_1\left(\tau + \frac{\Delta}{2}; a\right)$$

and an absolute value of $$R_2\left(\tau + \frac{\Delta}{2}; a\right),$$

with respect to the early sub-correlation function pair; and the late main correlation function $$R_{proposed}\left(\tau - \frac{\Delta}{2}; a\right)$$

has a waveform obtained by subtracting a waveform obtained by taking an absolute value of a sum of $$R_1\left(\tau - \frac{\Delta}{2}; a\right) \text{ and } R_2\left(\tau - \frac{\Delta}{2}; a\right)$$

from a waveform obtained by adding an absolute value of $$R_1\left(\tau - \frac{\Delta}{2}; a\right)$$

and an absolute value of $$R_2\left(\tau - \frac{\Delta}{2}; a\right),$$

with respect to the late sub-correlation function pair.

16. The method of claim 10, wherein a discrimination function $D(\tau)$ is selected to determine whether a value of the main correlation function based on the phase delay value $\tau$ is located at an apex of the main peak based on the discrimination output.

17. The method of claim 16, wherein the discrimination function $D(\tau)$ is defined by the following Equation:

$$D(\tau) = R_{proposed}^2\left(\tau + \frac{\Delta}{2}; a\right) - R_{proposed}^2\left(\tau - \frac{\Delta}{2}; a\right).$$

18. The method of claim 16, wherein the code phase delay value for the local code is determined to be a phase delay value $\tau$ when a zero-crossing of the discrimination function $D(\tau)$ is detected.

19. A method of generating a correlation function used to track a code phase delay value for a local code to be correlated with a received cosine or sine binary offset carrier (BOC)-modulated signal, in which N pulses successively occur in a single period $T_c$ of a spreading code chip, in a spread spectrum signal receiver apparatus, the method comprising:
generating, in the spread spectrum signal receiver apparatus, a local signal pair $g_1(t+\tau;a)$ and $g_2(t+\tau; a)$ having a phase delay value $\tau$ based on a first and second local signal pair $g_1(\tau;a)$ and $g_2(\tau;a)$ defined by first and last pulses of a signal pulse train, received during a single period of a sub-carrier of the received signal, and a given main peak shape parameter a;
generating a sub-correlation function pair $R_1(\tau;a)$ and $R_2(\tau;a)$ by performing correlation operations of the received signal and the local signal pair with respect to a total time $T(0 \leq t \leq T)$; and
generating a main correlation function $R_{proposed}(\tau;a)$ having only a main peak by performing an elimination operation of the sub-correlation function pair $R_1(\tau; a)$ and $R_2(\tau;a)$,
wherein the elimination operation is an operation that satisfies $|x|+|y|-|x-y|=0$ for real numbers x and y, and wherein $T_c$, t and T comprise positive real numbers, and N comprises a positive integer.

20. The method of claim 19, wherein the first and second local signal pair $g_1(t;a)$ and $g_2(t;a)$ are defined by first and last pulses $c_{i,0}(t)$ and $c_{i,N-1}(t)$ of N pulses, constituting a signal pulse train received during an i-th sub-carrier period of the received signal, and a main peak shape parameter a in accordance with the following equations:

$$\begin{cases} g_1(t; a) = \sum_{i=-\infty}^{\infty} \sqrt{\frac{N}{1+a^2}} \, (c_{i,0}(t) - ac_{i,N-1}(t)), \\ g_2(t; a) = \sum_{i=-\infty}^{\infty} \sqrt{\frac{N}{1+a^2}} \, (ac_{i,0}(t) - c_{i,N-1}(t)) \end{cases}$$

21. The method of claim 19, wherein if the BOC modulated received signal is $BOC_{sin}(kn,n)$,
$g_1(t;a)$ appears in a form of a pulse having a size of $$\sqrt{\frac{N}{1+a^2}}$$

at a location of the first pulse of the received signal pulse train and a pulse having a size of $$a\sqrt{\frac{N}{1+a^2}}$$

at a location of the last pulse thereof; and
$g_2(t;a)$ appears in a form of a pulse having a size of $$a\sqrt{\frac{N}{1+a^2}}$$

at a location of the first pulse of the received signal pulse train and a pulse having a size of $$\sqrt{\frac{N}{1+a^2}}$$

at a location of the last pulse thereof,
wherein k is a positive integer corresponding to a ratio of a chip period of a pseudo random noise (PRN) code to the period of a sub-carrier, and n corresponds to a ratio of a PRN code chip transmission rate to 1.023 MHz comprising a clock frequency of a C/A (Coarse/Acquisition) code.

22. The method of claim 19, wherein if a received signal B(t) is $BOC_{cos}(kn,n)$,
$g_1(t;a)$ appears in a form of a pulse having a size of at a location of the first pulse of the received signal pulse train and a pulse having a size of $$\sqrt{\frac{N}{1+a^2}}$$

at a location of the first pulse of the received signal pulse train and a pulse having a size of $$-a\sqrt{\frac{N}{1+a^2}}$$

at a location of the last pulse thereof; and
$g_2(t;a)$ appears in a form of a pulse having a size of $$a\sqrt{\frac{N}{1+a^2}}$$

at a location of the first pulse of the received signal pulse train and a pulse having a size of $$-\sqrt{\frac{N}{1+a^2}}$$

at a location of the last pulse thereof,
wherein k is a positive integer corresponding to a ratio of a chip period of a pseudo random noise (PRN) code to the period of a sub-carrier, and n corresponds to a ratio of a PRN code chip transmission rate to 1.023 MHz comprising a clock frequency of a C/A (Coarse/Acquisition) code.

23. The method of claim 19, wherein the main correlation function $R_{proposed}(\tau;a)$ is generated to have a waveform having a main peak having a width of $$\frac{2(1-a)T_c}{N(2-a)}$$

and a height of $$\sqrt{\frac{4(1-a)^2}{(N+Na^2)}}$$

by combining the sub-correlation function pair.

24. The method of claim 19, wherein the main correlation function $R_{proposed}(\tau;a)$ has a waveform obtained by subtracting a waveform obtained by taking an absolute value of a sum of $R_1(\tau;a)$ and $R_2(\tau;a)$ from a waveform obtained by adding an absolute value of $R_1(\tau;a)$ and an absolute value of $R_2(\tau;a)$, with respect to the sub-correlation function pair.

25. An apparatus for tracking a BOC signal, comprising:
a frequency offset compensation unit configured to output a compensated received signal compensated for frequency offset of a carrier frequency based on a carrier frequency compensation value with respect to a received signal obtained by cosine or sine binary offset carrier (BOC)-modulating predetermined data;
a local code generation unit configured to generate a delay-compensated local code based on a code phase delay value;
a mixer configured to mix the delay-compensated local code with the frequency offset-compensated received signal;
a DLL configured to repeatedly track and calculate a code phase delay value that allows a correlation value obtained by correlating the delay-compensated local signal and the frequency offset-compensated received signal with each other is located at an apex of a main peak of a correlation function, and to provide the calculated code phase delay value to the local code generation unit;
a phase lock loop (PLL) configured to repeatedly calculate a carrier frequency compensation value based on an autocorrelation value of a local code, based on the tracked code phase delay value, so that a phase error of a carrier signal can be minimized, and to provide the carrier frequency compensation value to the frequency offset compensation unit; and
a data extraction unit configured to extract spreading data from a mixture of the delay-compensated local code and the compensated received signal;
wherein the DLL operates to:
generate a local signal pair $g_1(t+\tau;a)$ and $g_2(t+\tau;a)$ having a phase delay value $\tau$ based on a first and second local signal pair $g_1(\tau;a)$ and $g_2(\tau;a)$ defined by first and last pulses of a signal pulse train, received during a single period of a sub-carrier of the compensated received signal, and a given main peak shape parameter a;
generate a sub-correlation function pair $R_1(\tau;a)$ and $R_2(\tau;a)$ by performing correlation operations of the compensated received signal and the local signal pair with respect to a total time $T(0 \leq t \leq T)$;
generate a main correlation function $R_{proposed}(\tau;a)$ having only a main peak by performing an elimination operation of the sub-correlation function pair $R_1(\tau;a)$ and $R_2(\tau;a)$; and
acquire and track a code phase delay value based on the generated main correlation function;
wherein the elimination operation is an operation that satisfies $|x|+|y|-|x-y|=0$ real numbers x and y;
wherein $T_c$, t and T comprise positive real numbers, and N comprises a positive integer; and
wherein the first and second local signal pair $g_1(t;a)$ and $g_2(t;a)$ are defined by first and last pulses $c_{i,0}(t)$ and $c_{i,N-1}(t)$ of N pulses, constituting a signal pulse train received during an i-th sub-carrier period of the received signal, and a main peak shape parameter a in accordance with the following equations:

$$\begin{cases} g_1(t;a) = \sum_{i=-\infty}^{\infty} \sqrt{\frac{N}{1+a^2}} \, (c_{i,0}(t) - ac_{i,N-1}(t)), \\ g_2(t;a) = \sum_{i=-\infty}^{\infty} \sqrt{\frac{N}{1+a^2}} \, (ac_{i,0}(t) - c_{i,N-1}(t)) \end{cases}$$

26. The apparatus of claim 25, wherein:
the received BOC signal carries satellite navigation data; and
the data extraction unit operates to extract the satellite navigation data and estimate a pseudorange based on the extracted navigation data.

27. A spread spectrum signal receiver system, comprising:
a front end unit configured to output a digital received signal obtained by cosine or sine binary offset carrier (BOC)-modulating a space wireless signal received from an antenna;
a baseband processing unit configured to acquire and track a code phase delay value for the output digital received signal using a DLL, to compensate for carrier frequency offset using a PLL, and to extract the contained data from a code delay-compensated local code and a frequency offset-compensated compensated received signal; and
an application function processing unit configured to perform a predetermined application function based on the extracted contained data;
wherein the baseband processing unit comprises a DLL that operates to:
generate a local signal pair $g_1(t+\tau;a)$ and $g_2(t+\tau;a)$ having a phase delay value $\tau$ based on a first and second local signal pair $g_1(\tau;a)$ and $g_2(\tau;a)$ defined by first and last pulses of a signal pulse train, received during a single period of a sub-carrier of the compensated received signal, and a given main peak shape parameter a;
generate a sub-correlation function pair $R_1(\tau;a)$ and $R_2(\tau;a)$ by performing correlation operations of the compensated received signal and the local signal pair with respect to a total time $T(0 \le t \le T)$;
generate a main correlation function $R_{proposed}(\tau;a)$ having only a main peak by performing an elimination operation of the sub-correlation function pair $R_1(\tau;a)$ and $R_2(\tau;a)$; and
acquire and track a code phase delay value based on the generated main correlation function;
wherein the elimination operation is an operation that satisfies $|x|+|y|-|x-y|=0$ for real numbers x and y;
wherein $T_c$, t and T comprise positive real numbers, and N comprises a positive integer; and
wherein the first and second local signal pair $g_1(t;a)$ and $g_2(t;a)$ are defined by first and last pulses $c_{i,0}(t)$ and $c_{i,N-1}(t)$ of N pulses, constituting a signal pulse train received during an i-th sub-carrier period of the received signal, and a main peak shape parameter a in accordance with the following equations:

$$\begin{cases} g_1(t;a) = \sum_{i=-\infty}^{\infty} \sqrt{\frac{N}{1+a^2}} \, (c_{i,0}(t) - ac_{i,N-1}(t)), \\ g_2(t;a) = \sum_{i=-\infty}^{\infty} \sqrt{\frac{N}{1+a^2}} \, (ac_{i,0}(t) - c_{i,N-1}(t)) \end{cases}$$

28. The spread spectrum signal receiver system of claim 27, wherein:
the spread spectrum signal receiver system is a satellite navigation signal receiver system;
the baseband processing unit operates to extract a pseudorange from each of a plurality of satellites to a satellite navigation signal receiver system from the contained data; and
the application function processing unit operates to calculate coordinates of the satellite navigation signal receiver system based on the pseudoranges provided with respect to the plurality of satellites.

* * * * *